United States Patent
Oshimi et al.

(10) Patent No.: US 10,310,770 B2
(45) Date of Patent: Jun. 4, 2019

(54) NONVOLATILE MEMORY DEVICE, AND STORAGE APPARATUS HAVING NONVOLATILE MEMORY DEVICE

(71) Applicant: Hitachi, Ltd., Chiyoda-ku, Tokyo (JP)

(72) Inventors: Masatsugu Oshimi, Tokyo (JP); Junji Ogawa, Tokyo (JP); Yoshihiro Oikawa, Tokyo (JP)

(73) Assignee: HITACHI, LTD., Tokyo (JP)

(*) Notice: Subject to any disclaimer, the term of this patent is extended or adjusted under 35 U.S.C. 154(b) by 9 days.

(21) Appl. No.: 15/741,600

(22) PCT Filed: Nov. 5, 2015

(86) PCT No.: PCT/JP2015/081205
§ 371 (c)(1),
(2) Date: Jan. 3, 2018

(87) PCT Pub. No.: WO2017/077624
PCT Pub. Date: May 11, 2017

(65) Prior Publication Data
US 2018/0196622 A1    Jul. 12, 2018

(51) Int. Cl.
*G06F 12/00* (2006.01)
*G06F 3/06* (2006.01)
(Continued)

(52) U.S. Cl.
CPC .......... *G06F 3/0659* (2013.01); *G06F 3/0611* (2013.01); *G06F 3/0652* (2013.01);
(Continued)

(58) Field of Classification Search
CPC ...... G06F 3/0659; G06F 12/16; G06F 3/0611; G06F 3/0652; G06F 3/0679;
(Continued)

(56) References Cited

U.S. PATENT DOCUMENTS 9,063,663 B2 * 6/2015 Suzuki ................ G06F 3/0608
2004/0003167 A1   1/2004 Kimura et al.
(Continued)

FOREIGN PATENT DOCUMENTS

JP    200430438 A    1/2004
JP    2009528609 A   8/2009
(Continued)

OTHER PUBLICATIONS

International Search Report for related PCT Application No. PCT/JP2015/081205 dated Dec. 8, 2015. (4 pages).

*Primary Examiner* — Matthew Bradley
(74) *Attorney, Agent, or Firm* — Procopio, Cory, Hargreaves & Savitch LLP

(57) ABSTRACT

This nonvolatile memory device has a blockwise-erase nonvolatile memory including a plurality of physical areas, and also has a memory controller which transmits one of a plurality of types of commands to the nonvolatile memory. After an erase command to erase one of the physical areas has been transmitted, but before a response to that erase command is received, the memory controller determines whether to suspend the ongoing erasure of the physical area, on the basis of whether there is a command to be transmitted and/or on the basis of the degree of deterioration of the physical area being erased. If the determination is affirmative, the memory controller transmits a command to the nonvolatile memory to suspend the erasure.

15 Claims, 12 Drawing Sheets

(51) Int. Cl.
*G06F 12/16* (2006.01)
*G06F 12/02* (2006.01)

(52) U.S. Cl.
CPC .......... *G06F 3/0679* (2013.01); *G06F 3/0688* (2013.01); *G06F 12/0246* (2013.01); *G06F 12/16* (2013.01); *G06F 2212/1036* (2013.01); *G06F 2212/7211* (2013.01)

(58) Field of Classification Search
CPC ............... G06F 3/0688; G06F 12/0246; G06F 2212/1036; G06F 2212/7211
See application file for complete search history.

(56) References Cited

U.S. PATENT DOCUMENTS

| | | |
|---|---|---|
| 2005/0248993 A1 | 11/2005 | Lee et al. |
| 2007/0239926 A1 | 10/2007 | Gyl et al. |
| 2010/0017555 A1* | 1/2010 | Chang ................ G06F 12/0246 711/103 |
| 2013/0148435 A1 | 6/2013 | Matsunaga |
| 2013/0254454 A1 | 9/2013 | Ide et al. |

FOREIGN PATENT DOCUMENTS

| | | | |
|---|---|---|---|
| JP | 2013122793 A | 6/2013 |
| JP | 2013200692 A | 10/2013 |

* cited by examiner

FIG. 6
Deterioration degree management table
452
| Chip number 601 | Block number 602 | Response time (measured value) 603 | The number of retries (measured value) 604 | The degree of deterioration 605 |
|---|---|---|---|---|
| 0 | 0 | 0.5 ms | 1 | Low |
| 1 | 1 | 3 ms | 4 | High |
| 2 | 2 | 1 ms | 2 | Low |
| ... | ... | ... | ... | ... |
FIG. 7
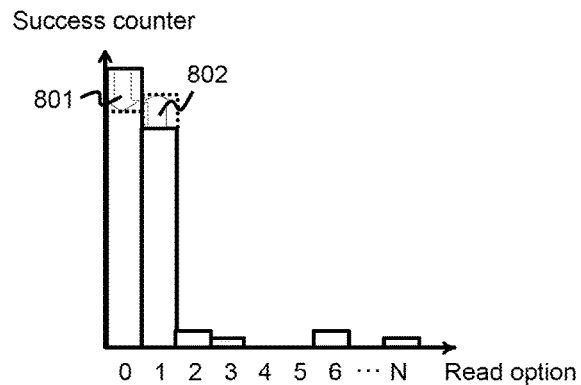
FIG. 8
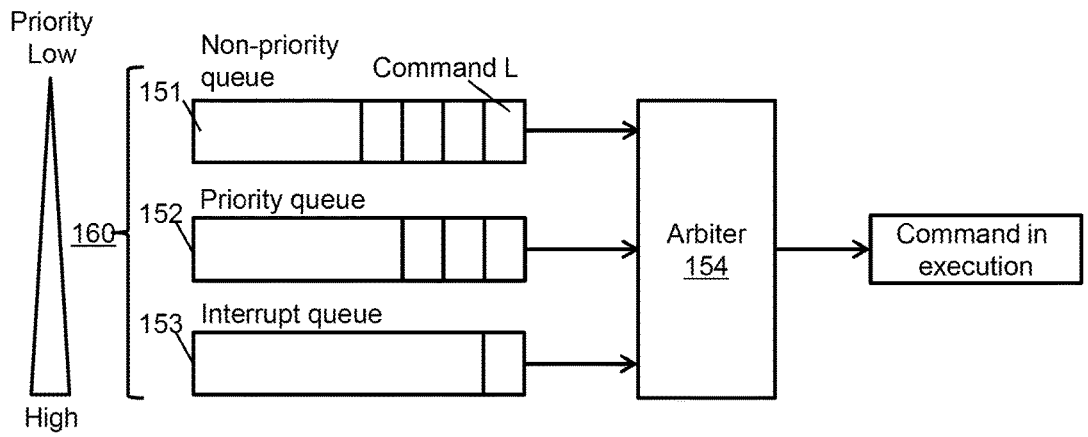

Queue allocation matrix

| Command type | Request from higher-level apparatus | | Reclamation | Refresh | |
| --- | --- | --- | --- | --- | --- |
| | User request | Application process | | Uncollectable error | Retention |
| Erase | Priority | Priority | Priority | Priority | Non-priority |
| Write | Priority | Priority | Priority | Priority | Non-priority |
| Read | Interruption | Priority | Priority | Priority | Non-priority |

< Statistics with "low" degree of deterioration >

Success counter 0 1 2 3 4 5 6 ⋯ N  Read option

If read fails in this range, read option for deterioration is selected

< Statistics with "high" degree of deterioration >

Success counter 0 1 2 3 4 5 6 ⋯ N

Read option determination table
453

|  | Read Option (OP) | |
|---|---|---|
|  | 0-3 | 4-N |
| Degree of deterioration | Low | High |

NONVOLATILE MEMORY DEVICE, AND STORAGE APPARATUS HAVING NONVOLATILE MEMORY DEVICE

CROSS-REFERENCE TO RELATED APPLICATIONS

This application is a U.S. National Stage entry of PCT Application No: PCT/JP2015/081205 filed Nov. 5, 2015, the contents of which are incorporated herein by reference.

TECHNICAL FIELD

The present invention generally relates to a nonvolatile memory device.

BACKGROUND ART

Typically, a flash memory (FM) device has been known as a nonvolatile memory device. Typically, the FM device includes an FM and an FM controller. The FM controller receives a command (e.g., a read command) from a higher-level apparatus with respect to the FM device, and returns a response to the command to the higher-level apparatus. In a case where the command is required to be transmitted to the FM in order to return the response to the command, the FM controller transmits the command (e.g., the read command) to the FM.

The FM includes a plurality of FM chips. Each FM chip is, for example, an NAND-type FM chip. Each FM chip includes multiple blocks. Erasure is performed by the FM controller in units of blocks. "Block erasure" is erasure of data from the block.

Improvement in refinement of FM chips makes FMs have large capacities while causing a possibility of reduction in quality. It is predicted that large increase in the capacity and reduction in the quality of FM increase the command response time of an FM device (a time from reception of the command by the FM device from a higher-level apparatus to return of a response to the command to the higher-level apparatus).

One reason of the prediction of increase in command response time is that increase in erasure time (a time required to perform erasure) is predicted. More specifically, for example, according to at least one of the following (1) and (2), the erasure time is predicted to be increased.
(1) Erasure is performed in units of blocks, while the block size tends to be increased according to large increase in the capacity of FM. The erasure time of a block having a large size is long.
(2) If the quality in FM is reduced, at least one block is prone to deterioration. The deteriorating block has a long erasure time.

The FM chip that contains an ongoing erasure block is in a busy state. The FM controller cannot transmit, to the FM, a command that is designated another block coupled to a same CE (chip enable) line in the FM chip containing the ongoing erasure block.

A plan of suspending erasure by interruption (temporary stop) (e.g., PTLs 1 and 2) can be considered as an improvement plan for reducing the command response time.

CITATION LIST

Patent Literature

[PTL 1] Japanese Patent Laid-Open No. 2004-30438
[PTL 2] US2005/0248993

SUMMARY OF INVENTION

Technical Problem

According to suspension of erasure, a command designated another block coupled to the same CE line in the FM chip that contains a block under ongoing erasure can be transmitted to the FM.

However, frequent occurrence of suspension of erasure causes a possibility that free blocks are depleted. Meanwhile, if the erasure is not suspended, a problem of increase in command response time can occur as described above.

Analogous problems can also occur in FMs other than the NAND type FM. Furthermore, analogous problems can occur in nonvolatile memory devices other than the FM device.

Solution to Problem

A nonvolatile memory device has a blockwise-erase nonvolatile memory including a plurality of physical areas, and a memory controller which transmits any type of a command among a plurality of types of commands to the nonvolatile memory. After an erase command to erase one of the physical areas has been transmitted, but before a response to the erase command is received, the memory controller determines whether to suspend erasure of the physical area being erased, on the basis of whether there is a command to be transmitted and/or on the basis of the degree of deterioration of the physical area being erased. If the determination is affirmative, the memory controller transmits a command to the nonvolatile memory to suspend the erasure.

Advantageous Effects of Invention

Free physical areas can be prevented from being depleted while the command response time can be prevented from being increased.

BRIEF DESCRIPTION OF DRAWINGS

FIG. 6 shows a configuration of a deterioration degree management table.
FIG. 7 shows an example of read success statistics.
FIG. 8 shows a configuration of a queue set.

DESCRIPTION OF EMBODIMENTS

Figure 1:
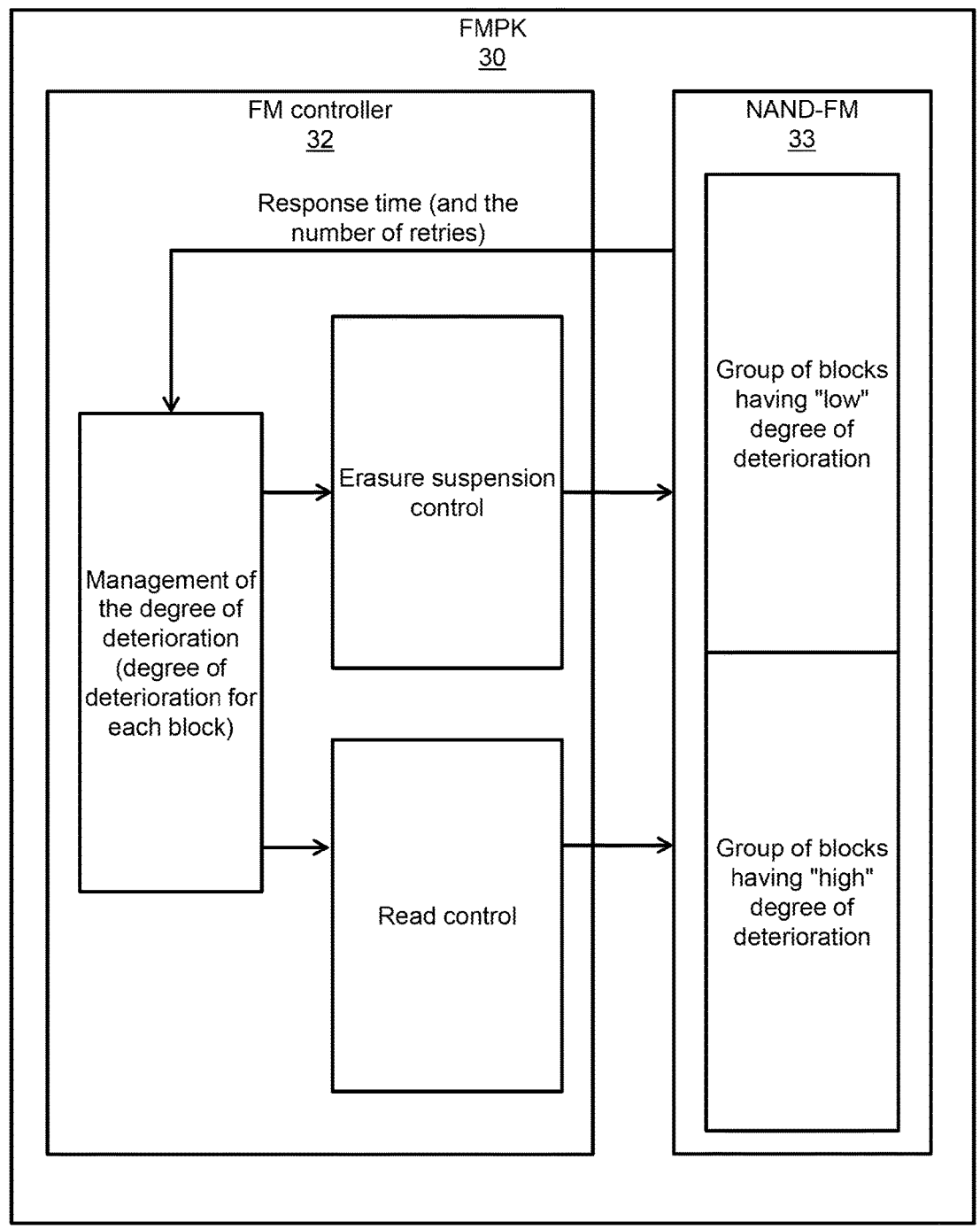
FIG. 1 shows an overview of Embodiment.

Hereinafter, referring to the diagrams, an Embodiment is described.

In the following description, various types of information are sometimes described in representation of "kkk table" or "kkk queue". Alternatively, the various types of information may be represented in a data structure other than that of the table. To represent independence of the data structure, at least one of "kkk table" and "kkk queue" can be called "kkk information". The configuration of the table is only one example. Two or more tables may be integrated in one table. Alternatively, one table may be divided into two or more tables.

In the following description, identification numbers are used as identification information on various targets. Alternatively, identification information other than the identification numbers (e.g., identifiers that contain alphabets and symbols) is also adoptable.

In the following description, processes are sometimes described with "program" being adopted as a subject of a sentence. Alternatively, the subject of a process may be a processor (e.g., CPU (Central Processing Unit)), because the program is executed by the processor to thereby perform a predetermined process while appropriately using storing resources (e.g., memory) and/or a communication interface device (e.g., a communication port). The process described with the program being adopted as the subject of a sentence may be regarded as a process executed by a processor or an apparatus that includes the processor. The processor may include a hardware circuit that performs a part or all of the process. The program may be installed from a program source into each controller. The program source may be, for example, a program distribution computer, or a computer-readable storing medium. In the following description, two or more programs may be realized as one program. One program may be realized as two or more programs.

In the following description, the communication interface device is sometimes abbreviated as "I/F".

In the following description, an FM device that includes a flash memory (FM) (hereinafter, an FM package is abbreviated as "FMPK") is exemplified as a nonvolatile memory device that includes a nonvolatile memory. Alternatively, instead of the FM device, a nonvolatile memory device is adoptable that includes another type of nonvolatile memory (e.g., a semiconductor memory, such as MRAM (Magnetoresistive Random Access Memory), ReRAM (Resistance Random Access Memory), or FeRAM (Ferroelectric Random Access Memory)).

In the following description, a word that represents the magnitude relationship, such as "good"/"bad", "high"/ "low", or "large"/"small", may be a word that represents the magnitude relationship in comparison with a threshold, unless specifically described. The "threshold" may be a fixed value (e.g., a predetermined value), or a variable value (e.g., a value calculated based on statistics or the like).

In the following description, for avoidance of confusion, a command that the FMPK receives from the higher-level apparatus is sometimes called "command H", and a command issued in the FMPK is sometimes called "command L". Likewise, a response to the command H (a response to the higher-level apparatus) is sometimes called "response H", and a response to the command L is sometimes called "response L".

Hereinafter, for avoidance of redundancy, a description "a block designated by the command L" is made. This description strictly means "a block belonging to an address designated by the command L". More specifically, for example, in a case where the FM is an NAND-FM and the command L is a read command L, the read is performed in units of pages. Accordingly, "a block designated by the read command L" means "a block that contains a page belonging to an address designated by the read command".

FIG. 1 shows an overview of Embodiment.

An FMPK 30 includes an NAND type FM (hereinafter, an NAND-FM) 33, and an FM controller 32 coupled to the NAND-FM 33. The NAND-FM 33 includes a plurality of FM chips (not shown). Each FM chip includes a plurality of blocks. Each block includes a plurality of pages. In this Embodiment, the block serving as an erasure unit is an example of a physical area. Alternatively, the page serving as a unit (a unit of read and write) that is smaller than the erasure unit may be an example of a physical area.

A first method for reducing the command response time (a time from reception of a command by the FM controller 32 from the higher-level apparatus to returning of the response to the higher-level apparatus) may be a method of suspending the erasure by an interruption in a case of ongoing erasure of another block coupled to the same CE line in the FM chip that contains the block designated by the command L based on the command H. This is because the FM chip that contains the ongoing erasure block is in a busy state.

However, frequent occurrence of suspension of erasure causes a possibility that free blocks are depleted.

A second method for reducing the command response time may be a method of reducing the number of retries (the number of read retries) of the command L based on the command H. This is because the smaller the number of retries is, the more quickly the read is completed, and resultantly the response H can be quickly returned to the higher-level apparatus.

However, in a case where the block designated by the read command L deteriorates, the number of retries tends to be high. In general, in a case where the FM has a low quality, the block tends to deteriorate.

In the NAND-FM 33, the degrees of deterioration of blocks are not necessarily uniform. Blocks having low degrees of deterioration (relatively less deteriorating blocks), and blocks having high degrees of deterioration (relatively more deteriorating blocks) sometimes reside in a mixed manner.

In this Embodiment, as shown in FIG. 1, the FM controller 32 executes at least one of erasure suspension control and read control. An overview of each of the erasure suspension control and the read control are, for example, as follows.

<Erasure Suspension Control>

The FM controller 32 determines whether to suspend erasure of the ongoing erasure block or not on the basis of at least one of the presence or absence of the transmission target (execution target) command L and the degree of deterioration of the ongoing erasure block. More specifically, for example, the FM controller 32 suspends the erasure and executes the transmission target command L if all the following (Condition 1) to (Condition 3) are satisfied.

(Condition 1) presence of an interrupt command that is a command regarded as an interrupt target.

(Condition 2) satisfaction of an interruption acceptable condition.

(Condition 3) a finish scheduled time point of the erasure being later than a finish acceptable time point of the transmission target command L.

If at least one of (Condition 1) to (Condition 3) is not satisfied, the FM controller 32 does not suspend the erasure (continues the erasure). The erasure may be suspended if at least one of (Condition 1) to (Condition 3) is satisfied.

Here, as for (Condition 1), "presence of an interruption command" means that the interrupt command is the transmission target command L.

As for (Condition 2), "satisfaction of an interruption acceptable condition" may be satisfaction of at least one of (1) configuring of interruption acceptance, (2) the number of free blocks of the NAND-FM 33 being equal to or larger than a predetermined value, and (3) the finish acceptable time point of erasure being later than the finish scheduled time point of the transmission target command L. The "finish acceptable time point of erasure" is the latest time point that is acceptable as the finish time point of the erasure. The "finish scheduled time point of transmission target command L" is a time point at which execution of the transmission target command L by the FM controller 32 is predicted to be finished on the basis of the degree of deterioration of the block designated by the transmission target command L.

As for (Condition 3), the "finish scheduled time point of erasure" is a time point at which the erasure by the FM controller 32 is predicted to be finished on the basis of the degree of deterioration of the ongoing erasure block. The "finish acceptable time point of transmission target command L" is a time point at which the latest time point that is acceptable as the finish time point of the transmission target command L.

<Read Control>

The FM controller 32 determines at least one of the read option of the transmission target read command L, and the upper limit of the number of retries (hereinafter, $TH_R$), on the basis of the degree of deterioration of the block (read source block) designated by the transmission target read command L based on the read command H. The read option is, for example, a number associated with the read scheme (voltage). The read option may be selected on the basis of the relationship between the degree of deterioration and the read option (e.g., the relationship according to the read option, and the statistics of the number of read success times and the degree of deterioration) and the degree of deterioration of the read source block. For example, the $TH_R$ may be the default value in a case where the degree of deterioration of the read source block is low, and the $TH_R$ may be the $TH_R$ for deterioration (the number of retries smaller than the default value) in a case where the degree of deterioration of the read source block is high. The "transmission target read command L" may be an interrupt command in the erasure suspension control.

In a case where the read has not succeeded even with the number of retries reaching the $TH_R$, the FM controller 32 executes at least one subsequent command (waiting command) if this command is present. The FM controller 32 may determine that the degree of deterioration of the read source block is higher with respect to the failed read, select at least one of the read option and the $TH_R$ on the basis of the higher degree of deterioration, and re-execute read after completion of at least one subsequent command.

The $TH_R$ may be determined on the basis not only of the degree of deterioration of the read source block but also of the degree of importance of the transmission target read command L. The degree of importance may be designated from the higher-level apparatus, or may be determined by the FM controller 32 on the basis of the type of the process for which the transmission target read command L is issued.

In this Embodiment, the FM controller 32 manages the degree of deterioration of each block. In at least one of the erasure suspension control and the read control, the degree of deterioration of the target block (the block designated by the transmission target command L) is the degree of deterioration managed for the target block.

<Management of Degree of Deterioration>

The FM controller 32 holds management information that contains information representing the degree of deterioration of each block, and appropriately updates the management information. For example, when the FM controller 32 transmits the command L that designates a block X to the NAND-FM 33, this controller measures the response time from transmission of the command L to return of the response L. In a case where the command L is the read command L, the FM controller 32 also measures the number of retries of the read command L. The FM controller 32 determines (calculates) the degree of deterioration of the block X on the basis of the measured response time (and the measured number of retries), and registers the determined degree of deterioration, as the degree of deterioration of the block X, in the management information. In this Embodiment, the degree of deterioration is determined by the FM controller 32 on the basis of the response time (measured value) and the number of retries (measured value). The degree of deterioration may be determined further based on another element, such as the number of error bits. The number of retries (measured value) and the like are measured in the case where the transmitted command L is the read command L. The degree of deterioration may be determined on the basis only of the response time in a case where the transmitted command L is the erase command L or the write command L. Alternatively, in the case where the transmitted command L is the erase command L or the write command L, the determination of the degree of deterioration may be skipped (i.e., the degree of deterioration may be determined on the basis only of the value measured for the read command L (e.g., the response time or the number of retries)).

Hereinafter, this Embodiment is described in detail.

Figure 2:
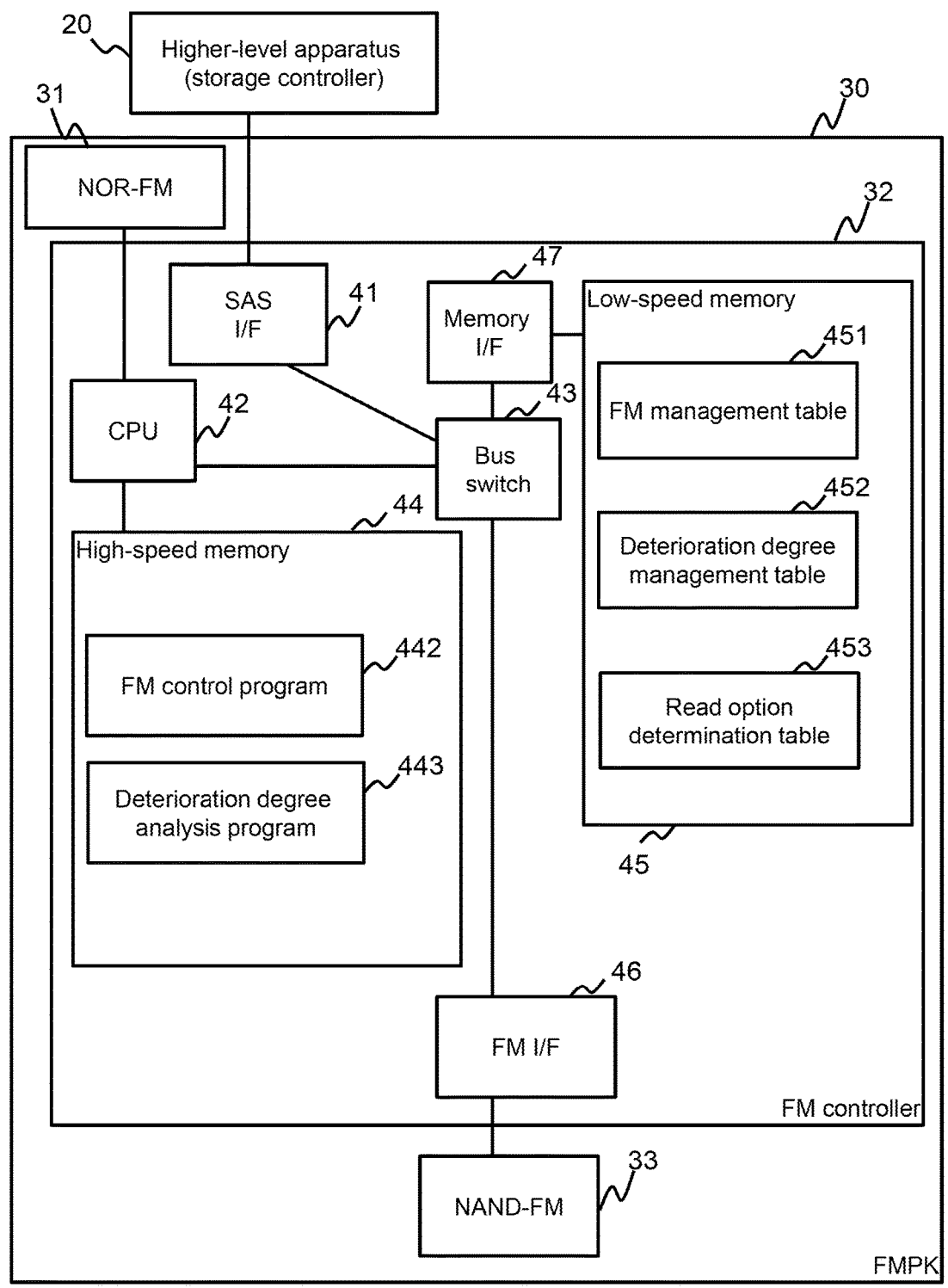
FIG. 2 shows a configuration of an FMPK.

FIG. 2 shows the configuration of the FMPK 30.

The FMPK 30 includes an NOR-type flash memory (hereinafter an NOR-FM) 31, an FM controller 32 that includes a CPU 42, and an NAND-FM 33.

The NOR-FM 31 stores at least one of a program executed by the CPU 42, and information used by the CPU 42. The NAND-FM 33 includes a plurality of (or a single) NAND-FM chip(s). The NAND-FM chip may be an SLC (Single Level Cell) type, or an MLC (Multi Level Cell) type. In the NAND-FM 33, data is stored according to the write command L from the FM controller 32 having received the write command H from the higher-level apparatus 20.

The FM controller 32 includes the CPU 42, an SAS (Serial Attached SCSI) I/F 41, a bus switch 43, a memory I/F 47, a low-speed memory 45, a high-speed memory 44, and an FM I/F 46.

The SAS I/F 41 is a communication interface device coupled to the higher-level apparatus 20, and mediates data communication between the higher-level apparatus 20 and the portions on the bus switch 43 side. The SAS I/F 41 performs data communication with the higher-level apparatus 20 according to the SAS. The higher-level apparatus 20 is a storage controller described later. Alternatively, the higher-level apparatus 20 may be a computer, such as a PC (Personal Computer), instead of the storage controller.

The bus switch 43 is coupled to the CPU 42, the SAS I/F 41, the memory I/F 47 and the FM I/F 46, and relays data between these portions.

The memory I/F 47 is a communication interface device coupled to the low-speed memory 45, and controls input and output of data from and to the low-speed memory 45.

The low-speed memory 45 is, for example, DRAM (Dynamic Random Access Memory) or nonvolatile memory, and stores various pieces of data used for processes by the CPU 42. The low-speed memory 45 stores the management information. The management information includes, for example, an FM management table 451, a deterioration degree management table 452, and a read option determination table 453. The FM management table 451 stores information required to manage the NAND-FM 33. The deterioration degree management table 452 represents the degree of deterioration of each block. The read option determination table 453 represents the relationship between the degree of deterioration and the read option. A part or some of these tables 451 to 453 may be embedded in at least one program executed by the CPU 42.

The high-speed memory 44 is, for example, an SRAM (Static Random Access Memory), and is directly coupled to the CPU 42. The high-speed memory 44 stores the program and the like executed by the CPU 42. In this Embodiment, the high-speed memory 44 stores an FM control program 442, and a deterioration degree analysis program 443. The FM control program 442 receives the command H from the higher-level apparatus 20, and executes the command H (for example, the FM control program 442 transmits the command L based on the received command H, to the NAND-FM 33). The FM control program 442 executes various processes pertaining to the NAND-FM 33. The deterioration degree analysis program 443 determines (calculates) the degree of deterioration of each block.

The FM I/F 46 is a communication interface device coupled to the NAND-FM 33, and controls input and output of data from and to the NAND-FM 33. The FM I/F 46 measures the response time of the command L.

The FM controller 32 provides a logical storage space (logic address space) for the higher-level apparatus. The FM management table 451 holds address conversion information that represents the correspondence relationship between the logical address and the physical address. The FM controller 32 identifies a page belonging to the physical address corresponding to the logical address designated by the I/O (Input/Output) command from the higher-level apparatus, and transmits the I/O command that designates the identified page. The logical address is, for example, an LBA (Logical Block Address). The logical address may contain a logical area ID (e.g., a logical block number or a logical page number) in addition to or instead of the LBA. The physical address is, for example, an PBA (Physical Block Address). The physical address may contain a physical area ID (e.g., a physical block number or a physical page number) in addition to or instead of the PBA.

The NAND-FM 33 is a blockwise-erase type (non-rewritable type). More specifically, instead of a page having already been allocated, a new free page is allocated to a write destination logical area. Data is written in the newly allocated page. Consequently, if data is not erased from the page, data cannot be newly written in the page. Consequently, the block is required to be erased. As for each logical area, data written in the newest allocated page (i.e., the latest data) is "valid data". The page in which the valid data is written is an "valid page". Data stored in the previously allocated page is "invalid data". The page in which the invalid data is written is a "invalid page". A page that is neither the valid page nor invalid page and can newly store data is "free page".

The configuration of the FMPK 30 is not limited to the configuration in FIG. 2. For example, the NOR-FM 31 is not necessarily provided. The program or information in the NOR-FM 31 may be stored in at least one of the high-speed memory 44 and the low-speed memory 45. Instead of a plurality of memories having different performances, such as the high-speed memory 44 and the low-speed memory 45, one or more memories having the same performance may be adopted.

Figure 3:
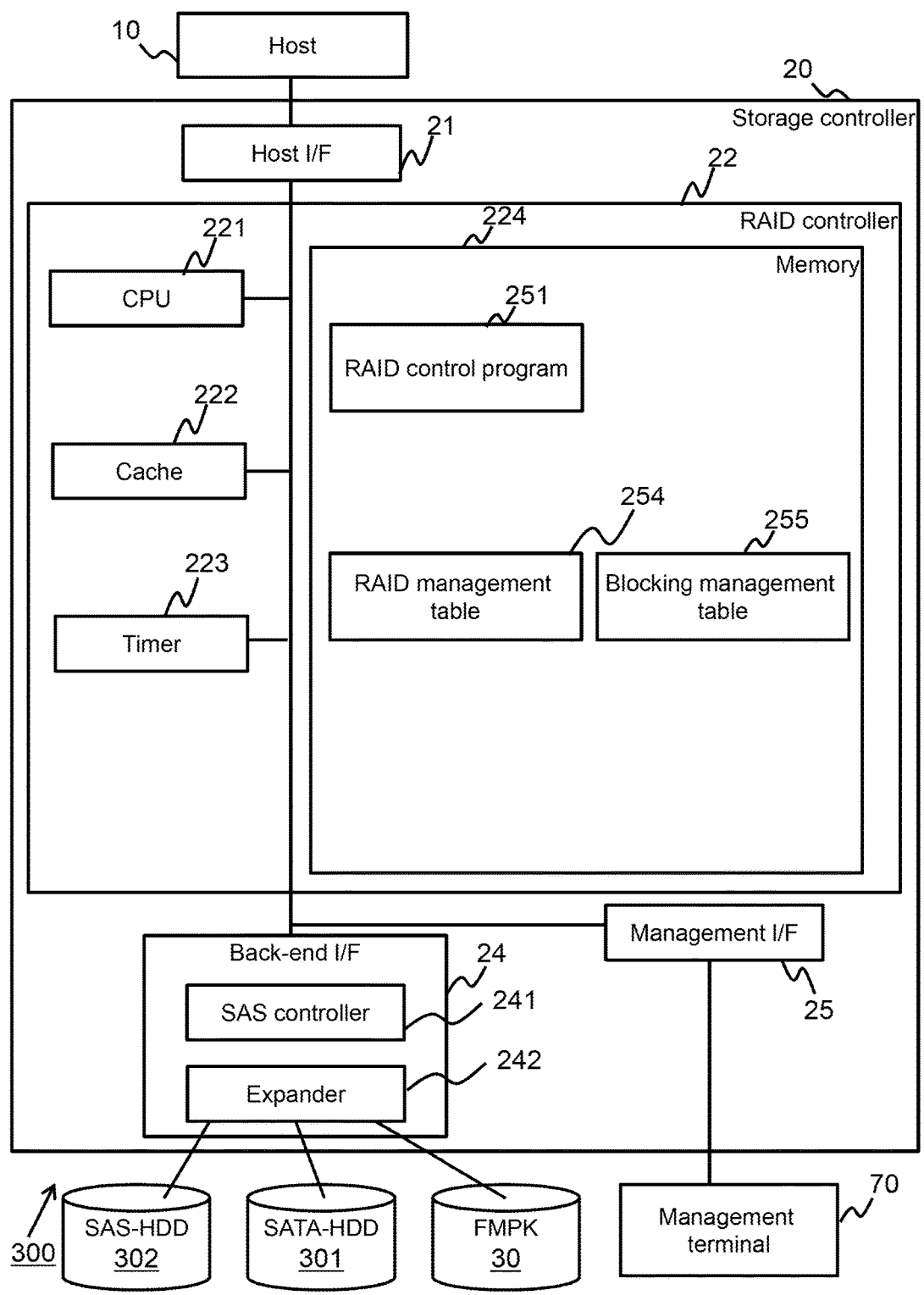
FIG. 3 shows a configuration of a storage apparatus according to Embodiment.

FIG. 3 shows the configuration of a storage apparatus according to Embodiment.

The storage apparatus 300 includes a storage controller 20 that is an example of the higher-level apparatus 20, an FMPK 30, an SAS-HDD 302, and a SATA (Serial ATA)-HDD 301. The number of at least one of the FMPK 30, the SAS-HDD 302, and the SATA-HDD 301 may be one or more. In this Embodiment a RAID (Redundant Array of Independent (or Inexpensive) Disks) group that includes a plurality of FMPKs 30, a RAID group that includes a plurality of SAS-HDDs 302, and a RAID group that includes a plurality of SATA-HDDs 301 are present.

The storage controller 20 includes a host I/F 21, a RAID controller 22, a management I/F 25, a back-end interface device (back-end I/F) 24.

The host I/F 21 is a communication interface device that mediates data exchange between a host system (one or more host computers; hereinafter "host") 10 and the storage controller 20. The host 10 inputs and outputs data used for processes from and to the storage controller 20.

The management I/F 25 is a communication interface device that mediates data exchange with a management terminal 70. The management terminal 70 is a computer, and includes an input unit (e.g., a keyboard and a pointing device) (not shown) that accepts an input from an administrator, and an output unit (e.g., a display device) (not shown) that outputs (typically, displays) information to the administrator.

The back-end I/F 24 mediates data exchange with PDEVs (physical storage devices), such as the FMPK 30, the SAS-HDD 302 and the SATA-HDD 301. The back-end I/F 24 includes an SAS controller 241, and an SAS expander (hereinafter, an expander) 242. The expander 242 is an example of a switch device, is capable of being coupled to a plurality of PDEVs (30, 301 and 302), and mediates data exchange between the SAS controller 241 and the PDEVs. The SAS controller 241 communicates with the PDEVs according to the SAS.

The RAID controller 22 performs control for access from the host 10 to the PDEVs. The RAID controller 22 includes a CPU 221, a cache memory 222, a timer 223, and a memory 224. The cache memory 222 caches data input into and output from the PDEVs. The timer 223 measures the time lapse. The CPU 221 uses the program and data stored in the memory 224, and executes various processes.

The memory 224 stores the program executed by the CPU 221, and stores the data to be used by the CPU 221. More specifically, the memory 224 stores a RAID control program 251, a RAID management table 254, and a blocking management table 255.

The RAID control program 251 performs RAID control for a RAID group on the basis of the RAID management table 254. The RAID control program 251 refers to the blocking management table 255, and notifies the FMPK 30 configuring the RAID group of the upper limit of the number of retries according to the number of blocked FMPKs 30 if the RAID group including the blocked FMPK 30 is present (the upper limit of the number of retries may be regarded as the default value of the upper limit of the number of retries of the read command L, in the read control described above). The RAID control program 251 communicates with the management terminal 70. The RAID control program 251 transmits the command through the back-end I/F 24 to the FMPK 30.

The RAID management table 254 is a table that contains information pertaining to the configuration of the RAID group. The blocking management table 255 is a table that contains information representing the states (a normal state, blocked state or the like) of the FMPKs 30 constituting the RAID group.

In this Embodiment, the storage controller 20 and the PDEV communicate with each other according to the SAS protocol. The storage controller 20 and the PDEV may communicate with each other according to a protocol other than the SAS (e.g., PCIe (PCI-Express)).

Figure 4:
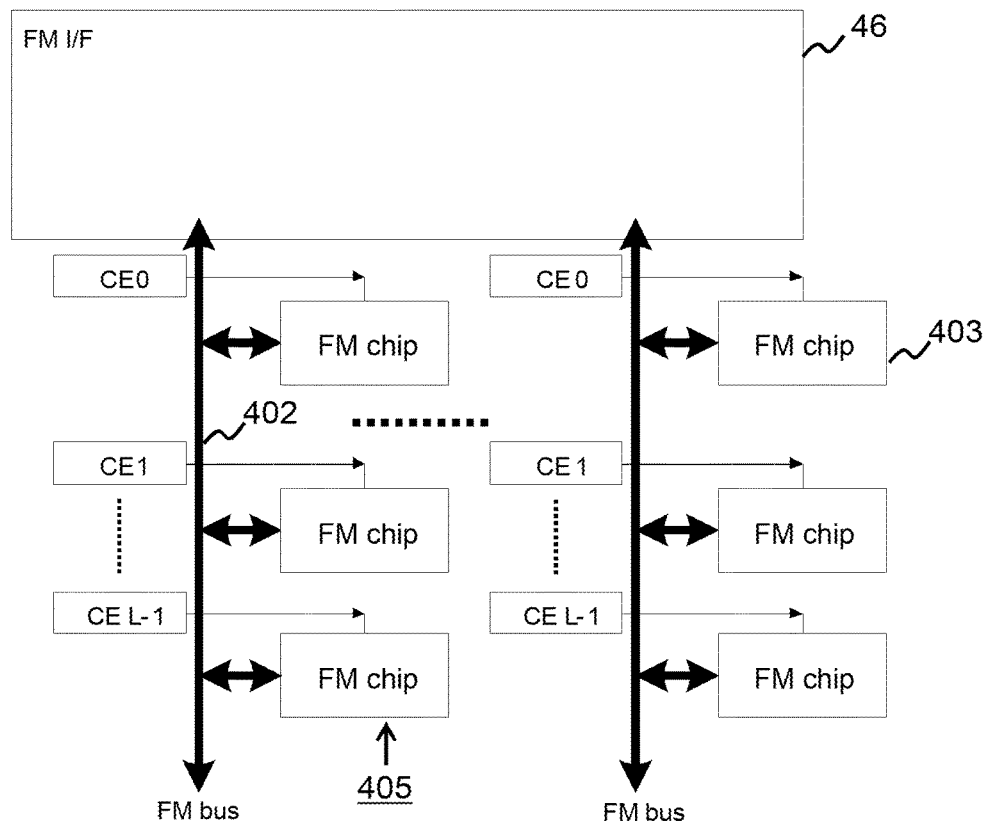
FIG. 4 shows coupling between an FM I/F and an NAND-FM.

FIG. 4 shows coupling between the FM I/F 46 and the NAND-FM 33.

The NAND-FM 33 includes a plurality of NAND-FM chips (hereinafter, FM chips) 403.

A plurality of FM buses 402 are coupled to the FM I/F 46. A plurality of FM chip groups 405 are coupled to the plurality of FM buses 402. Each FM chip group 405 includes two or more (or one) FM chip(s) 403. The plurality of FM chips 403 coupled to the different FM buses 402 are coupled to the identical CE line (chip enable line). A CE signal flowing through the CE line can enable a die. The FM I/F 46 can access a desired FM chip 403 by selecting the number of the FM bus and the number of the CE line. Although not shown, the plurality of FM chips 403 that share the common CE line, may also share a common R/B (ready/busy) line.

Figure 5:
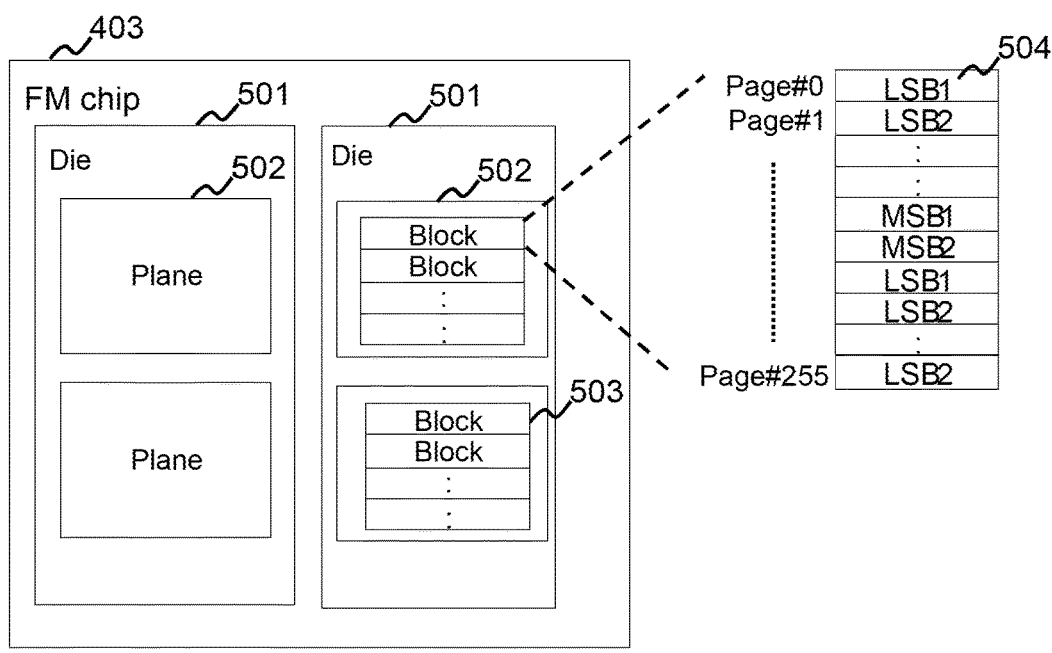
FIG. 5 shows a configuration of an FM chip.

FIG. 5 shows the configuration of the FM chip 403.

The FM chip 403 includes a first and a second die 501. Each die 501 includes a first and a second plane 502. Each plane 502 includes a plurality of blocks (physical blocks) 503. Each block 503 includes a plurality of pages (physical pages) 504. In the FM chip 403, data is input and output in units of pages, and data is erased in units of blocks. The first plane 502 may include odd-numbered blocks (blocks having odd numbers), and the second plane 502 may include even-numbered blocks (blocks having even numbers).

Each block 503 includes two types of LSB (Least Significant bit/byte) pages (LSB1 page and LSB2 page), and two types of MSB (Most Significant bit/byte) pages (MSB1 page and MSB2 page). Accordingly, each page 504 may be any of the four types of pages. The block configuration in FIG. 5 is an example. The block configuration may depend on at least any one of the chip and maker. The number of types of LSB pages may be one or three or more. Likewise, the number of types of MSB pages may be one or three or more.

In this Embodiment, the FM chip, die, plane, block and page are each one management unit of the NAND-FM 33. At least one of the number of dies included in a single FM chip 403, and the number of planes included in each die is not limited to the manner described above. The management units, such as a die and plane, are not necessarily defined.

In this Embodiment, not only the ongoing erasure block but also all the other blocks coupled to the same CE line in the FM chip that includes the ongoing erasure block are in the busy state. Accordingly, while erasure is performed in units of blocks, the busy state is achieved in units that are larger than blocks. More specifically, in this Embodiment, the unit for the busy state is the CE line unit. Alternatively, the unit may be the chip unit, die unit, or plane unit.

FIG. 6 shows the configuration of the deterioration degree management table 452.

The deterioration degree management table 452 represents the degree of deterioration of each block. More specifically, for example, the deterioration degree management table 452 contains a record for each block. Information registered in each record is a chip number 601, a block number 602, a response time 603, the number of retries 604, and the degree of deterioration 605.

The chip number 601 is the identification number of the FM chip 403 that includes the block. The block number 602 is the identification number of the block. The response time 603 represents a response time measured for the block. The number of retries 604 represents the number of read retries measured for the block. The degree of deterioration 605 represents the degree of deterioration determined (calculated) by the FM controller 32 (deterioration degree analysis program 443) on the basis of the response time 603 and the number of retries 604.

In this Embodiment, the degree of deterioration 605 is any of two types that are "low" and "high". For example, in a case that is any of a case where the response time 603 is less than a predetermined value and a case where the number of retries 604 is less than a predetermined value, the degree of deterioration 605 may be "low". In a case that is any of a case where the response time 603 is equal to or longer than the predetermined value and a case where the number of retries 604 is equal to or more than the predetermined value, the degree of deterioration 605 may be "high". The types of the degree of deterioration 605 may be three or more.

Every time the response time (and the number of retries) of the command L that designates the block is measured, the FM control program 442 registers the response time (and the number of retries) according to the block in the deterioration degree management table 452. The deterioration degree analysis program 443 determines the degree of deterioration on the basis of the registered response time 603 (and the number of retries 604), and maintains or updates the degree of deterioration 605 to be the determined degree of deterioration.

For at least one block, the degree of deterioration may be determined every time at least one of the response time 603 and the number of retries 604 is updated, or the degree of deterioration may be periodically determined on the basis of the response time 603 and the number of retries 604 without the immediate determination being made even if at least one of the response time 603 and the number of retries 604 is updated.

The FM controller 32 can select (determine) a likely read option from among read options on the basis of the read success statistics, for the read command L.

FIG. 7 shows an example of the read success statistics.

The read success statistics are the relationship between a plurality of read options and a plurality of success counters (values). The "likely read option" is, for example, a read option corresponding to the highest success counter in the read success statistics. In this Embodiment, there are (N+1) read options (N is an integer of 0 or higher). That is, the read options 0 to N are present.

If the read using the selected read option has succeeded, the FM control program 442 adds a value to the success counter corresponding to the read option (e.g., addition by one).

If read using the selected read option has fails, the FM control program 442 selects the next likely read option (e.g., the read option corresponding to the next higher success counter) on the basis of the read success statistics, and transmits the same read command L according to the selected read option. Such read retry is performed until the read succeeds in a range where the number of retries is equal to or lower than the upper limit of the number of retries. In a case where read does not succeed even if the number of retries reaches the upper limit of the number of retries, the read source block may be processed as a defective block.

The read success statistics may be calculated for each read environment. The "read environment" is defined as a plurality of attribute values corresponding to a plurality of (or one) read effect attribute(s). The "read effect attribute" is an attribute defined so that this attribute can affect the success and failure of read. As the read effect attribute, for example, at least the degree of deterioration may be adopted among the number of PEs (the number of data erasures), the time lapse (the time having elapsed from writing of data on the head page of the block), the FM bus number (the FM bus through which the read is performed), the CE number (the CE line through which the FM chip is selected from which read is performed), the die number (the die 501 from which read is performed), the plane number (the plane 502 from which read is performed), the page type (the type of page to which the page corresponds and from which read is performed), and the degree of deterioration (the degree of deterioration that the block has, the page being a block which is in this block from which read is performed).

The FM controller 32 selects the likely read option, every time of read, on the basis of the read success statistics (the relationship between the read option and the number of read success times) of the read environment to which the read source page belongs. Accordingly, the frequency of occurrence of read retry can be reduced. Consequently, reduction in read performance can be lessened. Every time the read command L succeeds, the number of read success times corresponding to the read option used for the successful read is updated. Accordingly, the correctness of the read success statistics is improved. Consequently, the appropriateness of the likely read option selected in the case of read is expected to be improved.

When read according to the likely read option (e.g., read option 0) selected for the identified read environment fails, a value may be subtracted from the success counter corresponding to the read option by the FM control program 442 (e.g., one is subtracted) (reference symbol 801 in FIG. 7). Accordingly, the success counter of the read option for the successful read (the priority of selection, in another view) can be relatively high. This is because if read according to the next likely read option (e.g., read option 1) has succeeded, the success counter corresponding to the read option is incremented as described above (reference symbol 802 in FIG. 7). Decrement of the success counter corresponding to the read option in a case of read failure may be performed every time the read fails or when the difference between the success counter of the read option corresponding to the read failure and the success counter of the next likely read option is less than a predetermined value.

The read is not limited to normal read (read according to the read command H from the storage controller 20). Alternatively, the read may be another type of read, for example, any one of reclamation read (read occurs in a reclamation process), refresh read (read occurs in a refresh process), and asynchronous read. The "asynchronous read" is read that occurs irrespective of (asynchronously with) the read command H from the storage controller 20. Any of the types of read may be performed by the FM control program 442. An example of asynchronous read may be a test read. In test read, the number of error bits of read data is detected, and is compared with each of one or more predetermined thresholds.

The FM management table 451 has a configuration capable of identifying the read environment for the read source page. More specifically, for example, the FM management table 451 may include the number of PEs (the number of data erasures of the block including the page), the time lapse (the lapse of time after writing of data on the head page of the block containing the page), the FM bus number (the number of the FM bus to which the FM chip containing the page is coupled), the CE number (the number of CE line to which the FM chip containing the page is coupled), the FM chip number (the number of the FM chip containing the page), the die number (the number of the die containing the page), the plane number (the number of plane containing the page), the page type (the type of page), and the degree of deterioration (the degree of deterioration of the block containing the page), for each page. When a predetermined process (e.g., erasure of data from the block) is performed by the FM control program 442, the FM management table 451 may be updated by the FM control program 442.

As described with respect to FIG. 1, in this Embodiment, at least one of the erasure suspension control and the read control is executed. Hereinafter, the details of each of the erasure suspension control and the read control are described.

<Details of Erasure Suspension Control>

FIG. 8 shows the configuration of a queue set.

The FM controller 32 includes a queue set 160. The queue set 160 is provided in a unit for a busy state, more specifically, for each CE line. At least one queue set 160 may be in at least one of the high-speed memory 44, the low-speed memory 45, and the FM I/F 46.

The queue set 160 includes two or more queues having different priorities, for example, a non-priority queue 151, a priority queue 152, and an interrupt queue 153. The interrupt queue 153 has the highest priority. The priority queue 152 has the next highest priority.

The FM controller 32 includes an arbiter 154. The arbiter 154 controls which queue in the queue set 160 the command L is to be obtained. The arbiter 154 is configured to obtain more frequently the command L from the priority queue 152 than from the non-priority queue 151. If the command L is in the interrupt queue 153, the arbiter 154 obtains the command L from the interrupt queue 153 with the highest priority. If any process such as of erasure is in execution with the command L being in the interrupt queue 153, the FM controller 32 can suspend the process in execution as required, and obtain and execute the command L in the interrupt queue 153 with the highest priority.

The command L issued by the FM controller 32 is added to any of the queues, and the command L obtained from the queue is transmitted to the NAND-FM 33.

Figures 9, 10:
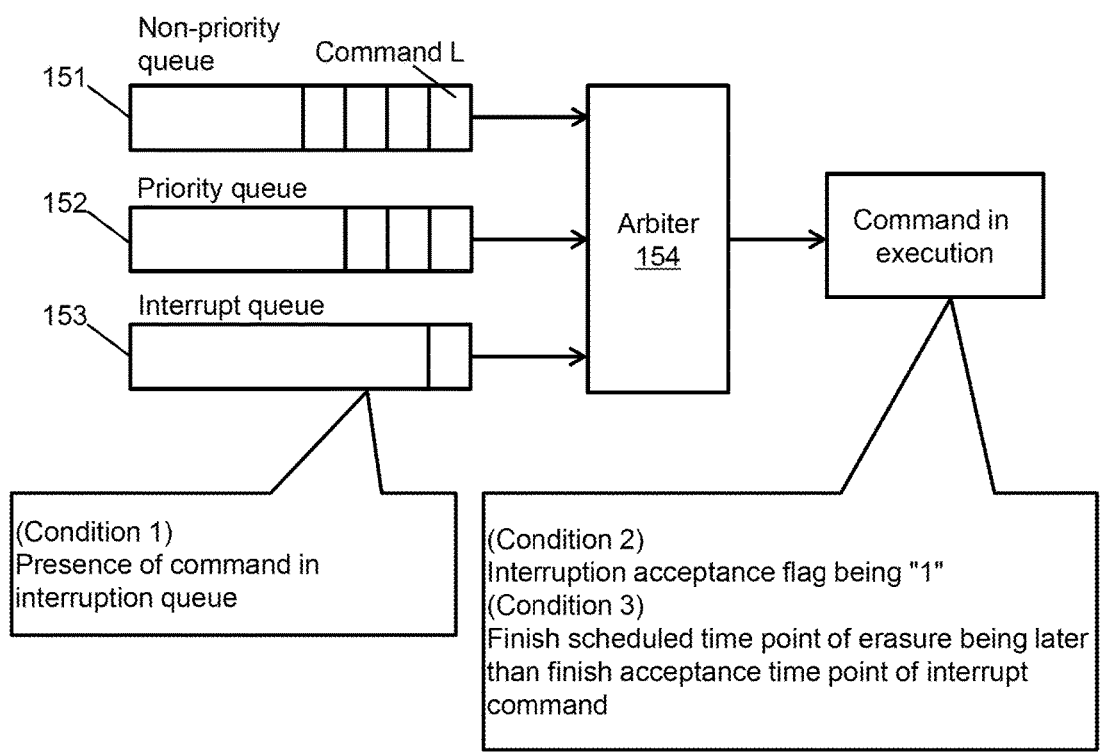
FIG. 9 shows a queue allocation matrix.
FIG. 10 shows conditions of erasure suspension.

FIG. 9 shows a queue allocation matrix.

According to the queue allocation matrix, the command L is added (allocated) to any of the queues. The queue allocation matrix may be prepared as a referable table, or embedded in the FM control program 442.

The types of the commands include the erase command, the write command, and the read command. For any type of command, the target block (e.g., the erasure target, write destination, or read source block) is designated.

The command issuance timing can be roughly classified into a "request from the higher-level apparatus" and an "inner process". The "request from the higher-level apparatus" is reception of the command H. The "inner process" is a process that is started without reception of the command H.

The "request from the higher-level apparatus" can be roughly classified into a "user request" and an "application process". The "user request" is reception of the command H issued in the process started in response to the command from the host 10. The "application process" is reception of the command H issued in the process (e.g., the process (e.g. remote copy) started in response to the command from the management terminal 70) started without any command from the host 10. In the command H transmitted from the storage controller 20 in the process according to the command from the host 10 and the management terminal 70, the command issuance timing (e.g., whether the "user request" or "application process") may be described. The FM controller 32 can know the issuance timing of the command H from the storage controller 20 on the basis of the command H.

The "inner process" can be roughly classified into "reclamation" and "refresh". The "refresh" can be roughly classified into "uncorrectable error" and "retention". The "reclamation" is copying of valid data from the first block to the second block and erasure of the data from the first block. The "uncorrectable error" is copying of data without any uncorrectable error from the first block that contains data containing the uncorrectable error to the second block and erasure of the data from the first block. The "retention" is copying of valid data that is in the first block and has not been updated for a predetermined time period to the second block and erasure of the data from the first block.

When the command issuance timing is other than "retention", any type of command L is added to the priority queue 152. When the issuance timing is "retention", the command is added to the non-priority queue 151. Only in a case of the command type "read" and the issuance timing "user request", the read command L is added to the interrupt queue 153. That is, in this Embodiment, the command L (the command L to be executed by an interruption) to be executed even if the process in execution for the NAND-FM 33 is to be suspended is the read command L based on the read command H with which the response is required to be made to the host 10. The combination of the type of the command L to be added to the interrupt queue 153 and the issuance timing is not necessarily limited to "read" and "user request".

In this Embodiment, a write-through mode (a mode of writing data in the NAND-FM 33 and returning the write response H, instead of temporarily cashing data according to the write command H (in the high-speed memory 44, for example) and returning the write response H) is not adopted for the FM controller 32. Accordingly, the write command L is not regarded as the interrupt target in any issuance timing. This is because the data can be temporarily written in the cache and can be asynchronously written in the NAND-FM 33 and the priority for an interruption is not required accordingly. In other word, in a case where write-through is adopted, the write command L issued at a part of issuance timing (e.g., "user request") may be added to the interrupt queue 153 (the command added to the interrupt queue 153 may be only the write command and the read command among the erase command, the write command and the read command).

FIG. 10 shows conditions of erasure suspension. In the following description, the finish scheduled time point of erasure is sometimes called "$END_{r1}$", and the finish acceptable time point of erasure is sometimes called "$END_{r2}$". On the other hand, the finish scheduled time point of the interrupt command L is sometimes called "$INT_{t1}$", and the finish acceptable time point of the interrupt command L is sometimes called "$INT_{t2}$".

The FM controller 32 suspends the ongoing erasure and executes the interrupt command L, only when all the following (Condition 1) to (Condition 3) are satisfied.
(Condition 1) presence of the interrupt command L (the command L being present at the head of the interrupt queue 153).
(Condition 2) an interruption acceptance flag being "1" (interruption acceptance).
(Condition 3) the finish scheduled time point of erasure ($END_{r1}$) being later than finish acceptable time point ($INT_{t2}$) of the interrupt command L ($END_{r1} > INT_{t2}$).

(Condition 1) is as follows, for example. That is, according to the matrix shown in FIG. 9, the interrupt command L is the read command L issued at the issuance timing "user request".

(Condition 2) is as follows, for example. (Condition 2) can be regarded as a condition for placing a limitation so as not to execute necessarily the erasure suspension even if (Condition 1) and (Condition 3) are satisfied. The interruption acceptance flag "1" or "0" (interruption disabled) may be manually changed or automatically changed. According to the automatic change, for example, the FM controller 32 sets the interruption acceptance flag to "1" if at least one of (y1) and (y2) is satisfied, and sets the interruption acceptance flag to "0" if (y1) and (y2) is not satisfied. The determination of whether at least one of (y1) and (y2) is satisfied or not may be performed periodically or at irregular intervals by the FM control program 442 (the determination may be performed every time the command L in the interrupt queue 153 is executed, for example). According to the result of the determination, the interruption acceptance flag may be maintained or updated.

(y1) The number of free blocks of the NAND-FM 33 is equal to or larger than a predetermined value.
(y2) The finish acceptable time point of erasure ($END_{r2}$) is later than the finish scheduled time point ($INT_{t1}$) of the interrupt command L ($END_{r2} > INT_{t1}$).

(y1) is as follows, for example. (y1) is a condition for making a priority that the number of free blocks does not fall below the predetermined value. The FM management table 451 represents the status of each block (e.g., free or in use), and the FM controller 32 refers to the FM management table 451, identifies the number of free blocks of the NAND-FM 33, and determines whether or not the identified number of free blocks is equal to or larger than the predetermined value. If the result of the determination is affirmative, the interruption acceptance flag is configured to "1".

(y2) is as follows, for example. (y2) is a condition for avoiding a case where the higher-level need ($END_{r2}$) is not satisfied when the interrupt command L is executed. The FM controller 32 identifies $END_{r2}$ (the latest time point that is acceptable as the finish time point of erasure). More specifically, for example, the maximum erasure time required for erasure of one block is configured in the FMPK 30 (or received from the higher-level apparatus), and the FM controller 32 calculates the finish acceptable time point of erasure on the basis of the start time point of erasure and the maximum erasure time. The FM controller 32 identifies $INT_{t1}$ (the time point predicted to be a time point at which execution of the command L is finished on the basis of the degree of deterioration of the block designated by the interrupt command L). More specifically, for example, in this Embodiment, in the command L having been issued and stored in the queue, the command L processing time (predicted value) is configured. The FM controller 32 can calculate $INT_{t1}$ on the basis of the start time point of the interrupt command L and the processing time. The FM controller 32 compares $END_{t2}$ with $INT_{t1}$. If $END_{t2}>INT_{t1}$ as a result, the interruption acceptance flag is configured to "1".

The processing time configured in the command L (predicted value) is a time calculated by the FM controller 32. If the command L is the read command L, the processing time (predicted value) may be calculated on the basis of the number of retries predicted based on the read statistics prediction described above.

(Condition 3) is as follows, for example. The FM controller 32 identifies $END_{t1}$. More specifically, for example, the erasure processing time is set in the FM controller 32 with respect to each degree of deterioration. The FM controller 32 identifies the erasure processing time corresponding to the degree of deterioration of the ongoing erasure block (the degree of deterioration identified from the deterioration degree management table 452), and predicts the time point at which erasure is finished, on the basis of the identified erasure processing time and the start time point of the erase command that designates the ongoing erasure block. The FM controller 32 identifies $INT_{t2}$. More specifically, for example, the finish acceptable time point of the command L (e.g., the latest time point that is acceptable as a time point of receiving the response L to the command L) is configured in each command L in the interrupt queue 153 by the FM controller 32. $INT_{t2}$ may be the time point determined on the basis of the latest time point that is acceptable as a time point at which the response H to the command H on which the command L is based is returned. $INT_2$ can be identified from the interrupt command L. The FM controller 32 compares $END_{t1}$ with $INT_{t2}$.

Figure 11:
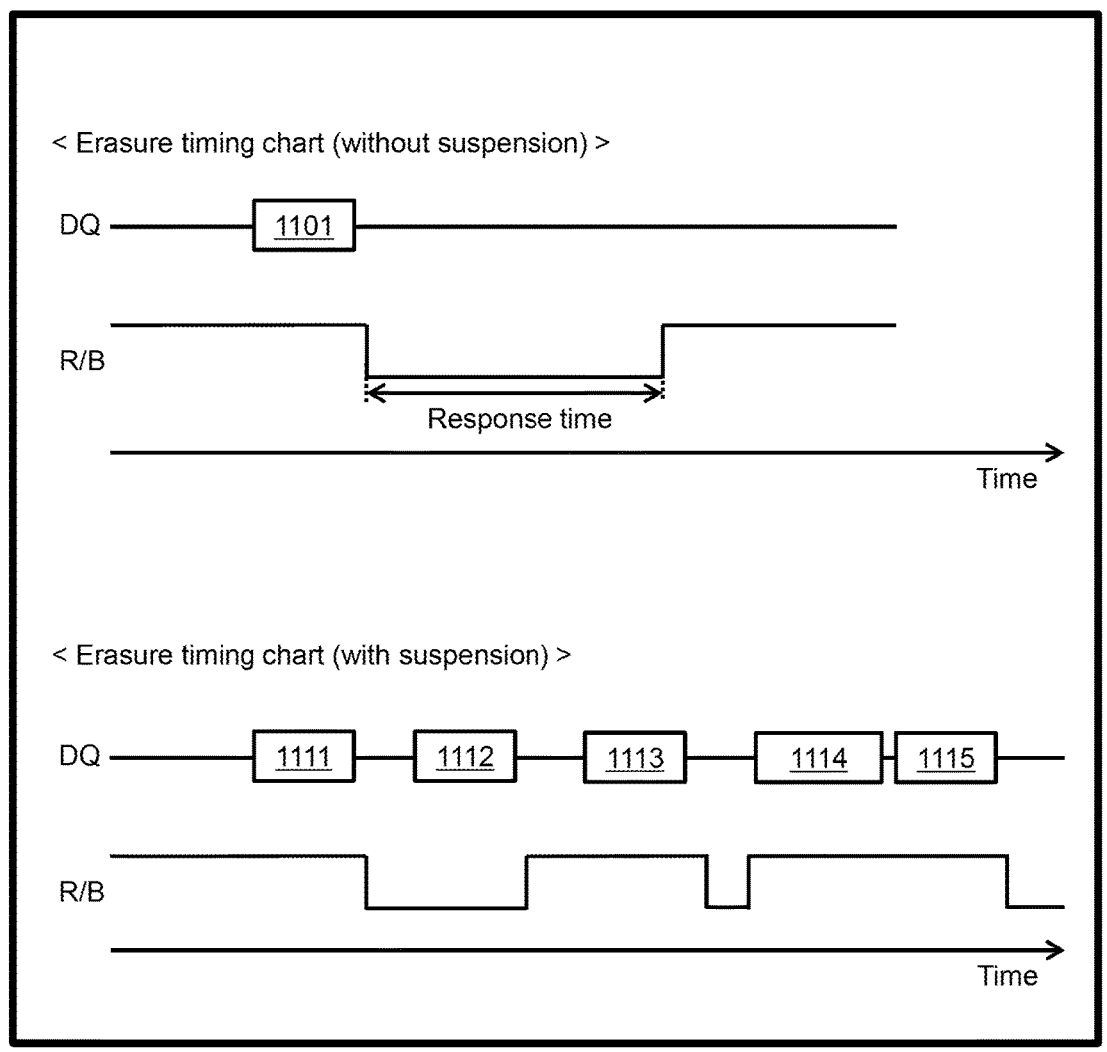
FIG. 11 an example of a timing chart in a case without erasure suspension from the start to finish of erasure, and an example of a timing chart in a case with erasure suspension from the start to finish of erasure.

FIG. 11 shows an example of a timing chart in a case without erasure suspension from the start to finish of erasure, and an example of a timing chart in a case with erasure suspension from the start to finish of erasure.

Besides the CE line described above, a DQ line where a command flows and an R/B line where an R/B signal (ready/busy signal) flows reside between the FM I/F 46 and the NAND-FM 33.

If there is no erasure suspension, the operation is as follows, for example. When the erase command 1101 flows through the DQ line (when erasure is started), the R/B signal becomes Low level (representing the busy state). If a response to the erase command is issued (erasure is finished), the R/B signal becomes High level (representing the ready state). The time from the start to finish of the erasure is the response time (erasure processing time). The response time tends to be long if the degree of deterioration of the erasure target block is high.

If there is an erasure suspension, the operation is as follows, for example. An erase command 1111 flows through the DQ line, thereby starting erasure. A suspend command 1112 flows through the DQ line during erasure (transmitted to the NAND-FM 33), thereby suspending erasure. That is, the R/B signal transitions from the Low level (busy state) to the High level (ready state). Accordingly, the read command 1113 that designates the block in the FM chip belonging to the CE line identical to that of the FM chip containing the ongoing erasure command can flow in the identical DQ line. When the data 1114 is read in response to the read command 1113 (when the execution of the read command L is finished), a Resume command (restart command) 1115 flows through the DQ line. Accordingly, the suspended erasure is resumed.

In this Embodiment, the suspendable process is only erasure. Instead of or in addition to the erasure, another process may be suspendable. The other suspendable process may be write, for example.

In a case where the suspendable process is erasure, it may be determined whether the erasure is suspended or not, irrespective of the type of interrupt command L during erasure (e.g., even if the interrupt command L is read command or write command). On the other hand, in a case where the suspendable process is write, if the interrupt command L is a read command during write, it may be determined whether the write is suspended or not; if the interrupt command L is a write command, the determination of whether the write is suspended or not may be not required. Alternatively, in a case where the priority order of the write command is different, execution of the write command having a low priority order may be suspended and the write command having a high priority order may be executed, for example.

Figure 12:
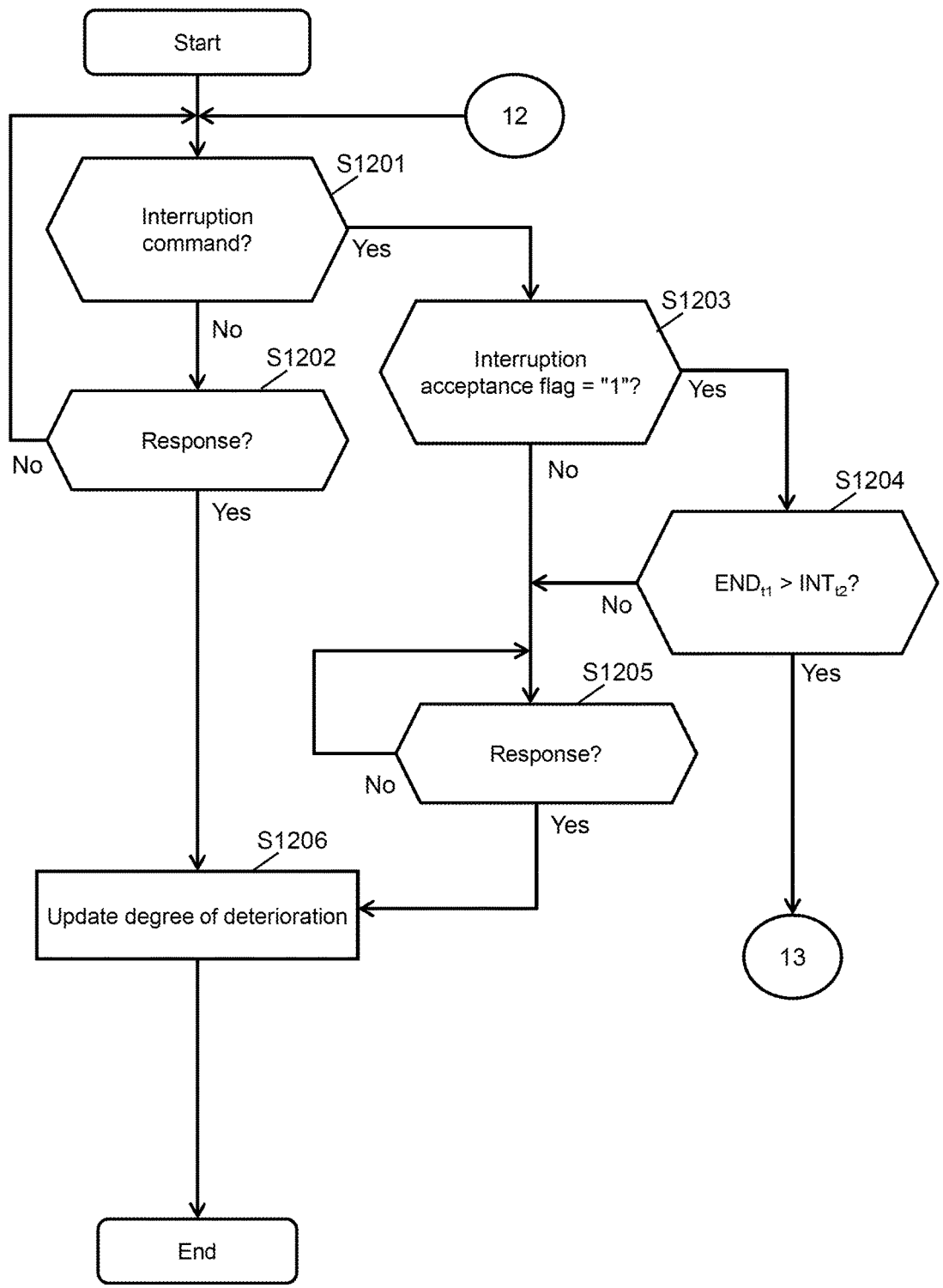
FIG. 12 is a part of a flowchart of erasure suspension control.
Figure 13:
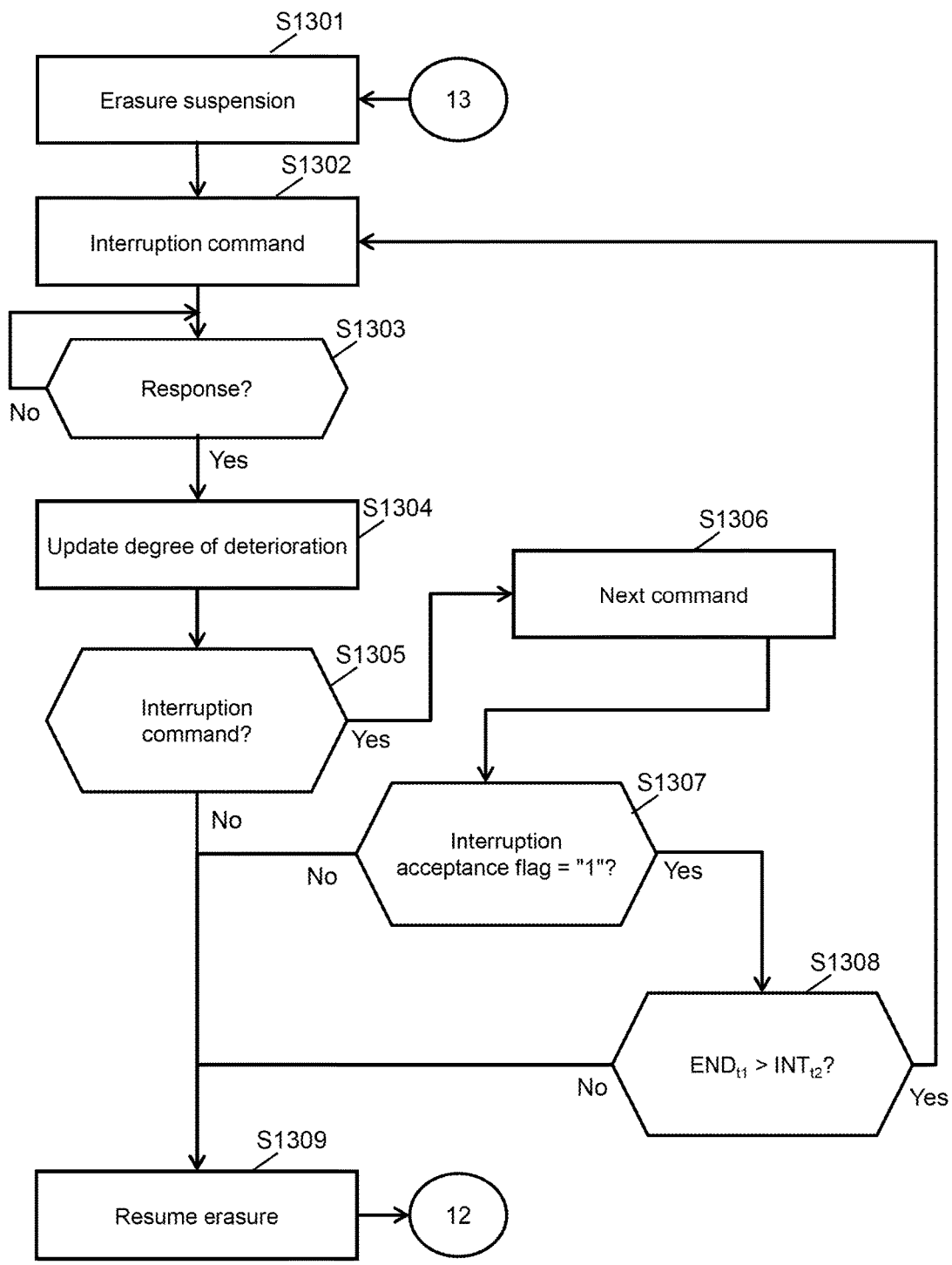
FIG. 13 is the remaining part of the flowchart of erasure suspension control.

FIGS. 12 and 13 are flowcharts of erasure suspension control.

When erasure is started, the FM control program 442 determines whether or not the interrupt command L is in the interrupt queue 153 (more specifically, the interrupt queue 153 in the queue set 160 corresponding to the CE line to which the FM chip containing the ongoing erasure block belongs) (S1201).

If the interrupt command L is absent (S1201: No) and the erasure response is present (S1202: Yes), the FM control program 442 registers the erasure response time (measured value), as the response time 603 corresponding to the ongoing erasure block, in the FM management table 451 (S1206).

If the interrupt command L is present (S1201: Yes), the FM control program 442 determines whether the interruption acceptance flag is "1" or not (S1203). If the interruption acceptance flag is "0" (S1203: No) and the erasure response is present (S1205: Yes), S1206 described above is performed.

If the interruption acceptance flag is "1" (S1203: Yes), the FM control program 442 determines whether $END_{t1}>INT_{t2}$ (the finish scheduled time point of erasure is later than the finish acceptable time point of the interrupt command L) or not (S1204).

If $END_{t1} \leq INT_{t2}$ ($END_{t1}$ is the same as $INT_{t2}$ or $END_{t1}$ is earlier than $INT_{t2}$) (S1204: No) and the erasure response is present (S1205: Yes), S1206 is performed.

If $END_{t1}>INT_{t2}$ (S1204: Yes), as shown in FIG. 13, the FM control program 442 transmits the suspend command to suspend the erasure (S1301).

Subsequently, the FM control program 442 executes (transmits) the interrupt command L (S1302). If the response L to the interrupt command L is present (S1303: Yes), the FM control program 442 registers the response time of the interrupt command L (measured value), as the response time 603 corresponding to the block designated by the interrupt command L, in the FM management table 451 (S1304).

If the interrupt command L is not in the interrupt queue 153 (S1305: No), the FM control program 442 resumes the suspended erasure (transmits the Resume command) (S1309).

If the command L is in the interrupt queue 153 (S1305: Yes), the FM control program 442 regards the command L as the next execution candidate (next interrupt command L) (S1306) and determines whether the interruption acceptance flag is "1" or not (S1307). If the interruption acceptance flag is "0" (S1307: Yes), it is determined whether or not $END_{t1} > INT_2$ (the finish acceptable time point of the next interrupt command L) (S1308). If $END_{t1} > INT_{t2}$ (S1308: Yes), the FM control program 442 executes S1302 for the execution candidate command L. If the determination result of any of S1307 and S1308 is negative, the erasure is resumed (S1309 is executed).

During suspension of the erasure, one or more commands L in the interrupt queue 153 are executed, any of (Condition 1) to (Condition 3) is not satisfied. When it is detected that any of (Condition 1) to (Condition 3) is not satisfied, the loop shown in FIG. 13 is finished and S1201 is performed.

The flow of the erasure suspension control has thus been described above.

If the suspendable process is write, the write suspension control is performed. However, the flow of the write suspension control may be the same as the flow of the erasure suspension control. This is because the write command L is not added to the interrupt queue 153. In the case where the write command L can be added into the interrupt queue 153, the determination of whether or not the command L is in the interrupt queue (S1201) may be determination of whether or not the read command L is in the interrupt queue.

<Details of Read Control>

As described above, the FM controller 32 determines at least one of the read option of the read command L, and the upper limit of the number of retries ($TH_R$), on the basis of the degree of deterioration of the block (read source block) designated by the read command L. This is an example of a technique focusing on the read option and the statistics of the number of read success times are different between in the block having a high degree of deterioration and in the block having a low degree of deterioration, for example. In the example in FIG. 14, in the case where the read source block is a block having the degree of deterioration "low", and read is performed according to any read option among read to 3, in other words, in four times of read (three times of read retry), the read success probability is high. On the other hand, in the case where the read source block is a block having the degree of deterioration "high", the read success probability is low for each of the read options 0 to 3.

Figures 14, 15:
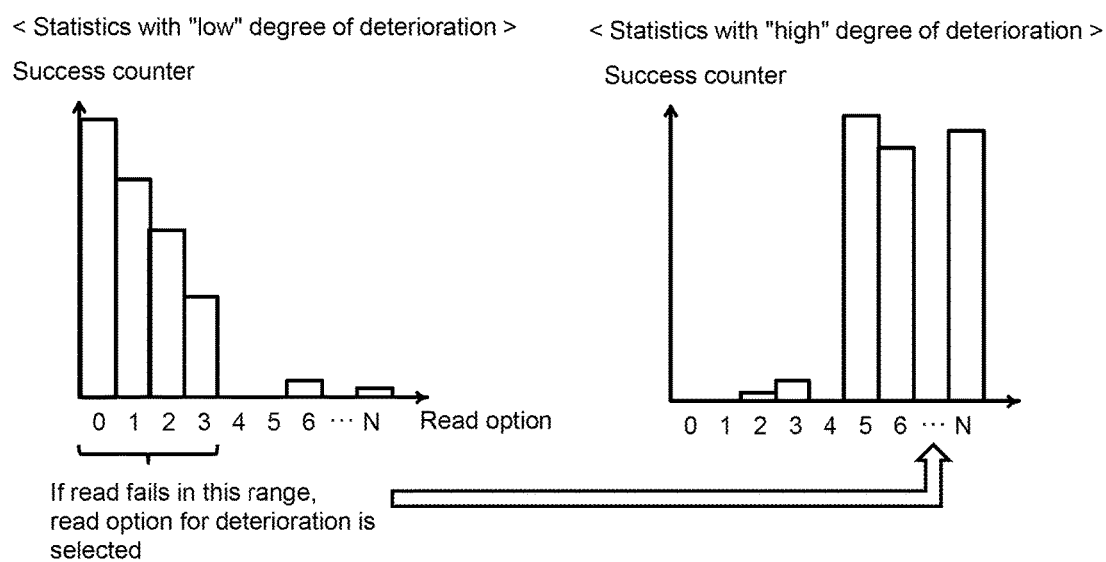
FIG. 14 shows an example of read success statistics with the degree of deterioration "low", and an example of read success statistics with the degree of deterioration "high".
FIG. 15 shows a configuration of read option determination table.

FIG. 15 shows the configuration of the read option determination table 453.

The read option determination table 453 represents the degree of deterioration and the read option with the large number of read success times (the number of read success times being equal to or larger than the predetermined value). For example, the table 453 may be updated periodically or at irregular intervals by the FM control program 442 on the basis of the read success statistics.

In the example in FIG. 15, the configuration is as follows, for instance. In the case where the degree of deterioration is "low", the read option having a large number of read success times is 0 to 3. In the case where the degree of deterioration is "high", the read option having a large number of read success times is 4 to N.

As for $TH_R$, in this Embodiment, normal $TH_R$ ($TH_R$ associated with the degree of deterioration "low"), and deterioration $TH_R$ ($TH_R$ associated with the degree of deterioration "high") are preliminarily prepared. The upper limit of the number of retries may be designated from the storage controller 20 (an example of the higher-level apparatus). In this case, $TH_R$ may be replaced with the upper limit of the number of retries designated by the storage controller 20. This is not limited thereto. $TH_R$ may be determined on the basis of the table 453. For example, in a case where change of the read option to be selected (e.g., increment) and read retry are repeatedly performed, $TH_R$ may be "3" (the number smaller than the number of read options "4" by one) for the degree of deterioration "low".

As described above, the read control of determining the read option and $TH_R$ based on the degree of deterioration of the read source block can achieve efficient read retry.

Figure 16:
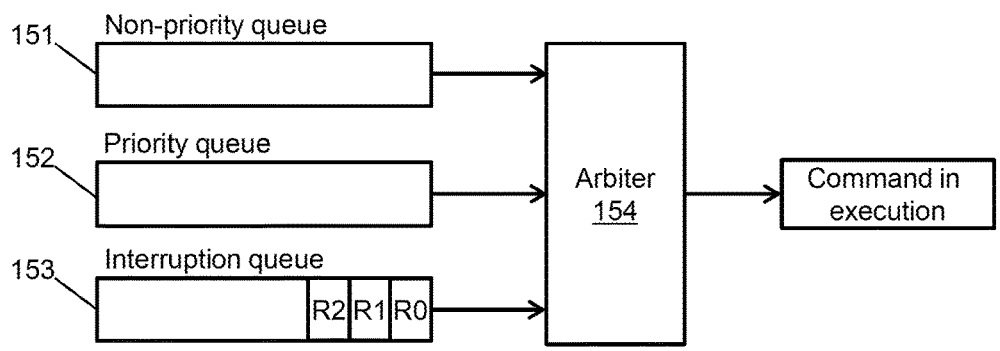
FIG. 16 shows an example of accumulation of R0 to R2.

More specifically, for example, as exemplified in FIG. 16, three read commands L R0 to R2 each have the issuance timing of "user request" (see FIG. 9). Accordingly, it is assumed that the commands have been accumulated in the interrupt queue 153. If the number of retries of R0 is large, start of R1 and R2 which are subsequent to R0 is delayed. Accordingly, there is a possibility that R1 (and R2) may not be able to be finished by the finish acceptable time point of R1 (and R2).

According to this Embodiment, the read option and $TH_R$ of R0 are determined on the basis of the degree of deterioration of the read source block of R0. More specifically, for example, in the case where the degree of deterioration of the read source block is "low", the read option 0 is selected as the read option by the FM control program 442 and the normal $TH_R$ "3" is selected as $TH_R$ on the basis of the read option determination table 453 exemplified in FIG. 15. The selected read option 0 may be the head read option in the read option range corresponding to the degree of deterioration "low", or the read option with the maximum number of read success times (the read option identified from the read success statistics corresponding to the degree of deterioration "low").

Figure 17:
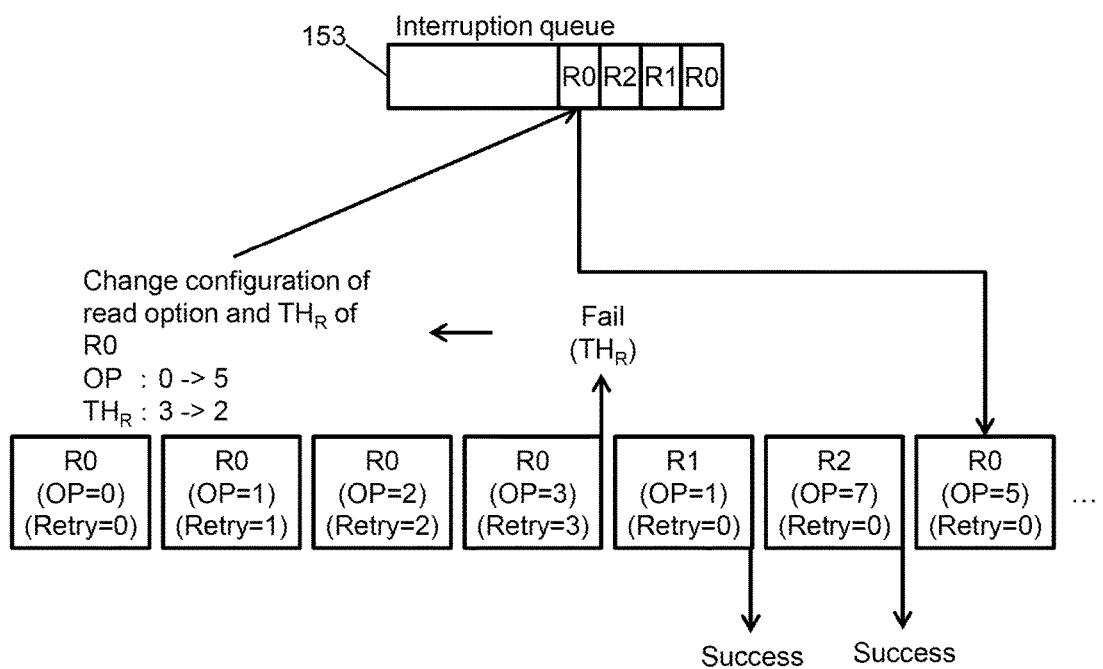
FIG. 17 is a schematic diagram of an example of read retry according to Embodiment.

According to such read control, the efficient read retry exemplified in FIG. 17 is expected.

That is, it is assumed that as the degree of deterioration of the read source block of R0 is "low", the read option 0 and the normal $TH_R$ "3" are selected. If read fails even with the number of retries of R0 reaching $TH_R$ "3", the FM control program 442 executes, first, the subsequent R1 and R2 (read control analogous to that of R0 is performed for each of R1 and R2).

As for R0 with failed read, the FM control program 442 changes the degree of deterioration 605 of the read source block from "low" to "high". That is, the degree of deterioration of the read source block is determined to be higher (the degree of deterioration 605 registered in the deterioration degree management table 452 is increased). The FM control program 442 refers to a read retry determination table 653 using the changed degree of deterioration "high" as a key, determines the read option and $TH_R$, and adds R0 to the tail of the interrupt queue 153. As a result, after R1 and R2 are finished, R0 is re-executed. In the execution of R0, the read option and $TH_R$ determined on the basis of the changed degree of deterioration "high" are used.

The $TH_R$ of R0 may be determined on the basis not only of the degree of deterioration of the read source block but also of the degree of importance of R0. If the degree of importance is "high", the maximum value of $TH_R$ (hereinafter, MAX) may be selected as $TH_R$ irrespective of the degree of deterioration. If the degree of importance is "low" and the degree of deterioration is "low", the normal $TH_R$ may be selected as $TH_R$. If the degree of importance is "low" and the degree of deterioration is "high", the deterioration $TH_R$ may be selected as $TH_R$.

The degree of importance of the read command L may be designated from the storage controller 20 (an example of the higher-level apparatus). For example, when the read command H is transmitted in the process required to be finished in time (e.g., collection copy for restoring the data in the RAID group), the storage controller 20 may designate the degree of importance "high" in the read command H. In this case, the degree of importance of the read command L based on the read command H may be "high". On the other hand, when the read command H is transmitted in the process that is not required to be finished in time (e.g., initial copy between logical volumes), the storage controller 20 may designate the degree of importance "low" in the read command H. In this case, the degree of importance of the read command L based on the read command H may be the degree of importance "low". Instead of the degree of importance being designated in the read command H, the degree of importance may be designated in a command H different from the read command H.

Figure 18:
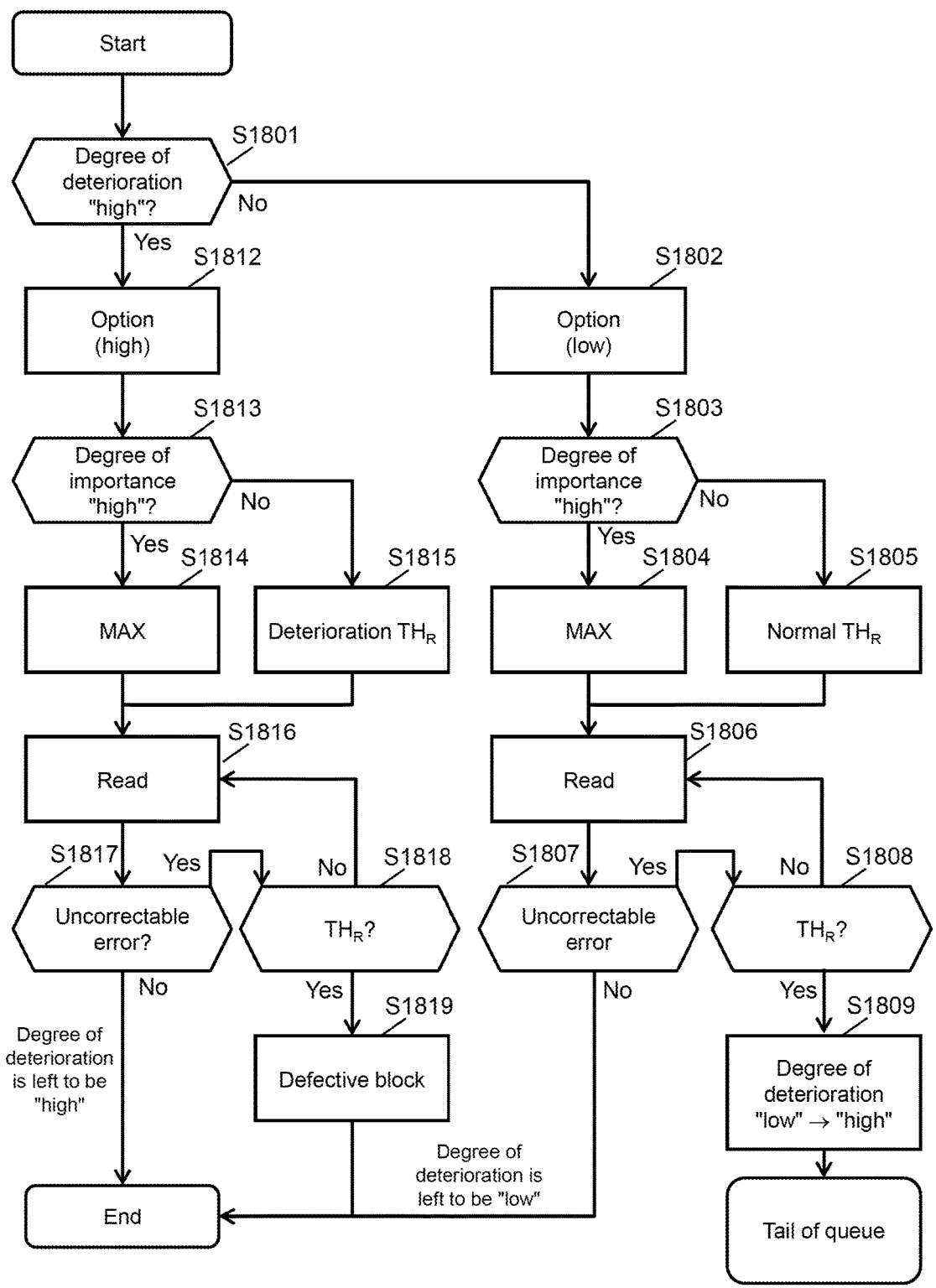
FIG. 18 is a flowchart of read control.

FIG. 18 is a flowchart of read control.

The FM control program 442 obtains the read command L from any queue, identifies the degree of deterioration of the block ("target block" in the description in FIG. 18) designated by the read command L ("target read command" in the description of FIG. 18) in the deterioration degree management table 452, and determines whether the identified degree of deterioration is "high" or not (S1801).

If the degree of deterioration is "low" (S1801: No), the following process is performed.

That is, the FM control program 442 selects the read option corresponding to the degree of deterioration "low" on the basis of the read option determination table 453 (S1802).

If the degree of importance of the target read command is "high" (S1803: Yes), the FM control program 442 selects MAX as $TH_R$ (S1804). If the degree of importance of the target read command is "low" (S1803: No), the FM control program 442 selects the normal $TH_R$ is selected as $TH_R$ (S1805).

The FM control program 442 transmits the target read command using the selected read option and $TH_R$ (S1806).

If no uncorrectable error occurs (i.e., read has succeeded) (S1807: No), read is finished. As a result, the degree of deterioration 605 corresponding to the target block is left "low".

On the other hand, if an uncorrectable error occurs (i.e., if read has failed) (S1807: Yes) and the number of retries does not reach $TH_R$ (S1808: No), the FM control program 442 re-executes the target read command using a read option different from the latest read option (e.g., the read option with a number incremented by one) (S1806).

Until the read succeeds, S1806 to S1808 are repeated. If the read fails even with the number of retries reaching $TH_R$ (S1808: Yes), the FM control program 442 increases the degree of deterioration 605 corresponding to the target block from "low" to "high" (S1809) and adds the target read command to the tail of the acquisition source queue. S1801 is performed again for the target read command at some stage. In a case where the degrees of deterioration are classified into three levels or more, the degree of deterioration may be increased by predetermined levels (e.g., one or more levels) in S1809.

If the degree of deterioration is "high" (S1801: Yes), the following process is performed.

That is, the FM control program 442 selects the read option corresponding to the degree of deterioration "high" on the basis of the read option determination table 453 (S1812).

If the degree of importance of the target read command is "high" (S1813: Yes), the FM control program 442 selects MAX as $TH_R$ (S1814). If the degree of importance of the target read command is "low" (S1813: No), the FM control program 442 selects the deterioration $TH_R$ as $TH_R$ (S1815).

The FM control program 442 transmits the target read command using the selected read option and $TH_R$ (S1816).

If no uncorrectable error occurs (S1817: No), read is finished. As a result, the degree of deterioration 605 corresponding to the target block is left "high".

On the other hand, if an uncorrectable error occurs (S1817: Yes) and the number of retries does not reach $TH_R$ (S1818: No), the FM control program 442 re-executes the target read command using a read option different from the latest read option (S1816).

Until the read succeeds, S1816 to S1818 are repeated. If the read fails even with the number of retries reaching $TH_R$ (S1818: Yes), the FM control program 442 processes the target block as a defective block (for example, registers the fact that the target block is a defective block in the FM management table 451) (S1819).

The flow of read control has thus been described above. In the case where the degrees of deterioration are classified into three levels or more, a process of S1802 to S1809 may be present for each of the levels other than the highest degree of deterioration. It is thus expected that the degree of deterioration 605 corresponding to the target block is gradually increased. On the basis of the read control described above, the following representations can be derived.

(Representation 1)

A nonvolatile memory device configured to receive a command from a higher-level apparatus and to return a response to the command, comprising:

a nonvolatile memory including a plurality of physical areas; and a memory controller configured to transmit a read command to the nonvolatile memory, wherein the memory controller is configured to determine at least one of a read option and an upper limit of the number of retries, with respect to the read command, based on a degree of deterioration of a read source physical area that is a physical area belonging to an address designated by the read command.

(Representation 2)

The nonvolatile memory device according to Representation 1, wherein the memory controller is configured to determine the upper limit of the number of retries of the read command, based not only on the degree of deterioration of the read source physical area but also on a degree of importance of the read command.

(Representation 3)

The nonvolatile memory device according to Representation 2, wherein the degree of importance of the read command is a degree of importance designated from the higher-level apparatus, with respect to the read command received by the memory controller from the higher-level apparatus, which is a command based on the read command.

(Representation 4)

The nonvolatile memory device according to any one of Representations 1 to 3, wherein when read fails even with the number of retries of the read command reaching the upper limit of the number of retries of the read command, the memory controller is configured to:

transmit at least one of commands subsequent to the read command, to the nonvolatile memory;

increase the degree of deterioration of the read source physical area;

determine at least one of the read option and the upper limit of the number of retries, with respect to the transmission target read command, based on the increased degree of deterioration; and retransmit the read command to the nonvolatile memory when the at least one command is completed.

(Representation 5)

The nonvolatile memory device according to Representation 4, wherein when read fails even with the degree of deterioration of the read source physical area being a highest degree of deterioration and the number of retries of the read command reaching the upper limit of the number of retries of the read command, the memory controller is configured to regard the read source physical area as a defective physical area.

(Representation 6)

The nonvolatile memory device according to any one of Representations 1 to 5, wherein the memory controller is configured to select the read option, based on a relationship between the degree of deterioration and the read option and on the degree of deterioration of the read source physical area, the relationship between the degree of deterioration and the read option is a relationship represented by read success statistics for each of a plurality of read environments, each of the read environments is defined by a combination of one or more values of read effect attributes that can affect success and failure of read, the one or more read effect attributes include the degree of deterioration, and each of the read success statistics represents the number of read success times for each read option.

(Representation 7)

The nonvolatile memory device according to any one of Representations 1 to 6, wherein the memory controller is configured to hold management information that is information representing the degree of deterioration of each of the physical areas, the memory controller is configured to transmit any command among multiple types of commands, to the nonvolatile memory, the memory controller is configured to:

(P) identify the degree of deterioration of the physical area belonging to the address designated by the command, based on a response time from transmission of the command designating the address to the nonvolatile memory to reception of a response to the command; and (Q) register the identified degree of deterioration, in the management information, and the degree of deterioration of the read source physical area is the degree of deterioration identified from the management information.

(Representation 8)

The nonvolatile memory device according to Representation 7, wherein when the command transmitted in (P) is the read command, the memory controller is configured to identify the degree of deterioration of the physical area belonging to the address designated by the read command, based not only on the response time of the read command but also on the number of retries of the read command.

(Representation 9)

A storage apparatus, comprising:

a RAID (Redundant Array of Independent (or Inexpensive) Disks) group including a plurality of nonvolatile memory devices; and a storage controller configured to transmit a command to each of the nonvolatile memory devices constituting the RAID group, wherein each of the plurality of nonvolatile memory devices is the nonvolatile memory device according to any one of Representations 1 to 8.

Embodiments have thus been described above. These are the examples for describing the present invention. There is no intention to limit the scope of the present invention only to Embodiments described above. The present invention can execute other various embodiments.

For example, the FMPK 30 is not necessarily mounted on the storage apparatus 300. Alternatively, the FMPK 30 may be coupled, as an external storing device of the host 10, to the host 10. In this case, the higher-level apparatus of the FMPK 30 is the host 10.

The units of configuring the read option may be units of blocks. Alternatively, the units may be units larger than the units of blocks, for example, units of dies or units of planes. In this case, for each die or each plane, the degree of deterioration of the die or plane may be determined according to a fact indicating the blocks the number of which is larger between blocks having the degree of deterioration "high" and blocks having the degree of deterioration "low", or the read option may be selected according to the degree of deterioration of the die or the plane.

REFERENCE SIGNS LIST

300 . . . Storage apparatus

The invention claimed is:

1. A nonvolatile memory device configured to receive a command from a higher-level apparatus and to return a response to the command, comprising:

a blockwise-erase nonvolatile memory including a plurality of physical areas; and a memory controller configured to transmit any type of a command among types of commands, to the nonvolatile memory;

wherein the types of commands include an erase command for a physical area, from transmission of the erase command to reception of a response to the erase command, the memory controller is configured to:

(A) determine whether or not to suspend erasure of the physical area being erased, based on at least one of presence or absence of a transmission target command and a degree of deterioration of the physical area being erased; and (B) transmit a command for suspending the erasure, to the nonvolatile memory, when a result of the determination of (A) is affirmative.

2. The nonvolatile memory device according to claim 1, wherein the determination of (A) includes a determination of whether (a1) is satisfied or not, (a1) a finish scheduled time point of the erasure is later than a finish acceptable time point of the transmission target command, the finish scheduled time point of the erasure is a time point at which the erasure is predicted to be finished, based on the degree of deterioration of the physical area being erased, and the finish acceptable time point of the transmission target command is a latest time point that is acceptable as a finish time point of the transmission target command.

3. The nonvolatile memory device according to claim 2, wherein the determination of (A) includes a determination of whether (a2) and (a3) are satisfied or not,
 (a2) an interrupt command that is a command regarded as an interrupt target is present,
 (a3) an interruption acceptable condition is satisfied,
when a determination result of (a1) or (a2) is negative, a determination result of (A) is negative.

4. The nonvolatile memory device according to claim 3, wherein satisfaction of the interruption acceptable condition is satisfaction of at least one of
 (a31) the number of available physical areas of the nonvolatile memory being equal to or larger than a predetermined value, and
 (a32) a finish acceptance time point of the erasure is later than a finish scheduled time point of the transmission target command,
the finish acceptable time point of the erasure is a latest time point that is acceptable as a finish time point of the erasure, and
the finish scheduled time point of the transmission target command is a time point at which execution of the transmission target command is predicted to be finished based on the degree of deterioration of the physical area designated by the transmission target command.

5. The nonvolatile memory device according to claim 3, wherein the types of the commands include the erase command, a write command, and a read command,
the interrupt command is a read command based on the read command from a host system, and
the host system is the higher-level apparatus, or an apparatus other than the higher-level apparatus.

6. The nonvolatile memory device according to claim 3, wherein the types of the commands include the erase command, a write command, and a read command,
the memory controller is configured not to execute a write-through mode in which data according to a write command from the higher-level apparatus is written into the nonvolatile memory and then a response to the higher-level apparatus is returned, and
the interrupt command is only the read command among the types of commands.

7. The nonvolatile memory device according to claim 3, wherein, after (B), the memory controller is configured to:
 (C) transmit the interrupt command to the nonvolatile memory;
 (D) determine whether to restart the suspended erasure or not upon receipt of a response to the interrupt command transmitted in (C); and
 (E) transmit a command for restarting the erasure, to the nonvolatile memory, when a result of the determination of (D) is affirmative, and
the determination of (D) includes determination of whether (d1) to (d3) are satisfied or not,
 (d1) another interrupt command is present,
 (d2) the interruption acceptable condition is satisfied, and
 (d3) a finish scheduled time point of the erasure is later than a finish acceptance time point of the interrupt command in (d1),
when at least one of (d1) to (d3) is not satisfied, a determination result of (D) is negative, and
when the determination of (D) is negative, (C) is performed for a transmission target command in (d1).

8. The nonvolatile memory device according to claim 1, wherein the memory controller is configured to hold management information that is information representing the degree of deterioration of each of the physical areas, and
the memory controller is configured to:
 (P) identify the degree of deterioration of the physical area belonging to an address designated by a command, based on a response time from transmission of the command designating the address to the nonvolatile memory to reception of a response to the command; and
 (Q) register the identified degree of deterioration, in the management information, and
the degree of deterioration of the physical area being erased is the degree of deterioration identified from the management information.

9. The nonvolatile memory device according to claim 8, wherein when the command transmitted in (P) is the read command, the memory controller is configured to identify the degree of deterioration of the physical area belonging to the address designated by the read command, based not only on the response time of the read command but also on the number of retries of the read command.

10. The nonvolatile memory device according to claim 1, wherein the nonvolatile memory includes a plurality of memory chips,
the memory controller and the plurality of memory chips are coupled to a plurality of CE (chip enable) lines, and
the memory controller is configured to perform (A) and (B) for each of the CE lines.

11. The nonvolatile memory device according to claim 10, wherein each of the physical areas is a block that includes two or more pages, and
the nonvolatile memory is a memory where data write and read are performed in units of pages and erasure is performed in units of blocks.

12. The nonvolatile memory device according to claim 1, wherein the transmission target command is a transmission target read command, and
the memory controller is configured to determine at least one of a read option and an upper limit of the number of retries, with respect to the transmission target read command, based on a degree of deterioration of a read source physical area that is a physical area belonging to an address designated by the transmission target read command.

13. The nonvolatile memory device according to claim 12, wherein the memory controller is configured to determines the upper limit of the number of retries of the transmission target read command, based not only on the degree of deterioration of the read source physical area but also on a degree of importance of the transmission target read command.

14. The nonvolatile memory device according to claim 12, wherein when read fails even with the number of retries of the transmission target read command reaching the upper limit of the number of retries of the transmission target read command, the memory controller is configured to:
 transmit at least one of commands subsequent to the transmission target read command, to the nonvolatile memory;
 increase the degree of deterioration of the read source physical area;

determine at least one of the read option and the upper limit of the number of retries, with respect to the transmission target read command, based on the increased degree of deterioration; and retransmit the transmission target read command to the nonvolatile memory when the at least one command is completed.

15. A storage apparatus, comprising:

a RAID (Redundant Array of Independent (or Inexpensive) Disks) group including a plurality of nonvolatile memory devices; and a storage controller configured to transmit a command to each of the nonvolatile memory devices constituting the RAID group, wherein each of the plurality of nonvolatile memory devices is configured to receive a command from the storage controller, and to return a response to the command, each of the nonvolatile memory devices includes:
 a blockwise-erase nonvolatile memory including a plurality of physical areas; and
 a memory controller configured to transmit any type of a command among types of commands, to the nonvolatile memory, the types of commands include an erase command for a physical area, and from transmission of the erase command to reception of a response to the erase command, the memory controller is configured to:
 (A) determine whether or not to suspend erasure of the physical area being erased, based on at least one of presence or absence of a transmission target command and a degree of deterioration of the physical area being erased; and
 (B) transmit a command for suspending the erasure, to the nonvolatile memory, when a result of the determination of (A) is affirmative.

* * * * *